US009636667B2

(12) United States Patent
Feyen et al.

(10) Patent No.: US 9,636,667 B2
(45) Date of Patent: May 2, 2017

(54) CHA-TYPE ZEOLITE MATERIALS AND METHODS FOR THEIR PREPARATION USING CYCLOALKYAMMONIUM COMPOUNDS

(71) Applicant: BASF SE, Ludwigshafen (DE)

(72) Inventors: Mathias Feyen, Hirschberg (DE); Ulrich Müller, Neustadt (DE); Roger Ruetz, Mannheim (DE); Thomas Bein, München (DE); Karin Möller, Gräfelfing (DE)

(73) Assignee: BASF SE, Ludwigshafen (DE)

( * ) Notice: Subject to any disclaimer, the term of this patent is extended or adjusted under 35 U.S.C. 154(b) by 734 days.

(21) Appl. No.: 13/908,666

(22) Filed: Jun. 3, 2013

(65) Prior Publication Data
US 2013/0323164 A1 Dec. 5, 2013

Related U.S. Application Data

(60) Provisional application No. 61/654,989, filed on Jun. 4, 2012.

(51) Int. Cl.
*C01B 39/04* (2006.01)
*B01J 29/70* (2006.01)
(Continued)

(52) U.S. Cl.
CPC ........ *B01J 29/7015* (2013.01); *B01D 53/565* (2013.01); *B01D 53/9418* (2013.01);
(Continued)

(58) Field of Classification Search
CPC ...... C01B 39/04; C01B 39/48; B01J 29/7015; B01J 29/86; B01J 29/87; B01J 29/89;
(Continued)

(56) References Cited

U.S. PATENT DOCUMENTS 4,544,538 A † 10/1985 Zones
4,610,854 A 9/1986 Zones
(Continued)

FOREIGN PATENT DOCUMENTS

CN 1646427 7/2005
CN 101489674 7/2009
(Continued)

OTHER PUBLICATIONS

PCT International Search Report and Written Opinion in PCT/IB2013/054569, mailed Nov. 7, 2013, 11 pgs.
(Continued)

*Primary Examiner* — David M Brunsman
(74) *Attorney, Agent, or Firm* — Oblon, McClelland, Maier & Neustadt, L.L.P.

(57) ABSTRACT

Aspects of the present invention relate to a process for the preparation of a zeolitic material having a CHA-type framework structure comprising $YO_2$ and $X_2O_3$, wherein said process comprises the steps of:
(1) providing a mixture comprising one or more sources for $YO_2$, one or more sources for $X_2O_3$, and one or more tetraalkylammonium cation $R^1R^2R^3R^4N^+$-containing compounds as structure directing agent;
(2) crystallizing the mixture obtained in step (1) for obtaining a zeolitic material having a CHA-type framework structure;

wherein Y is a tetravalent element and X is a trivalent element,
wherein $R^1$, $R^2$, and $R^3$ independently from one another stand for alkyl,
wherein $R^4$ stands for cycloalkyl, and
wherein the mixture provided in step (1) does not contain any substantial amount of a source for $Z_2O_5$, wherein Z is P,
(Continued)

as well as to zeolitic materials which may be obtained as well as to zeolitic materials which may be obtained according to the inventive process and to their use.

34 Claims, 15 Drawing Sheets

(51) Int. Cl.
*B01J 29/86* (2006.01)
*B01J 29/89* (2006.01)
*B01D 53/56* (2006.01)
*B01J 29/67* (2006.01)
*B01J 29/76* (2006.01)
*C01B 39/48* (2006.01)
*B01D 53/94* (2006.01)

(52) U.S. Cl.
CPC ............ *B01J 29/67* (2013.01); *B01J 29/763* (2013.01); *B01J 29/86* (2013.01); *B01J 29/89* (2013.01); *C01B 39/04* (2013.01); *C01B 39/48* (2013.01); *B01D 53/9427* (2013.01); *B01D 53/9436* (2013.01); *B01D 2255/50* (2013.01); *B01D 2258/012* (2013.01); *B01J 2229/186* (2013.01); *Y02C 20/10* (2013.01); *Y02P 20/153* (2015.11)

(58) Field of Classification Search
CPC ............ B01J 29/763; B01D 53/9418; B01D 53/9427; B01D 53/9436; B01D 2255/50; B01D 2258/012
See application file for complete search history.

(56) References Cited

U.S. PATENT DOCUMENTS

| 6,709,644 B2 † | 3/2004 | Zones |
| 8,383,080 B2 | 2/2013 | Cao et al. |
| 2003/0176751 A1 | 9/2003 | Strohmaier et al. |
| 2007/0043249 A1 | 2/2007 | Cao et al. |
| 2010/0022722 A1 | 1/2010 | Mertens et al. |
| 2011/0076229 A1 | 3/2011 | Trukhan et al. |

FOREIGN PATENT DOCUMENTS

| CN | 102099293 | 6/2011 |
| WO | WO2008033229 | 3/2008 |
| WO | WO2008039742 | 4/2008 |
| WO | WO2008083048 | 7/2008 |

OTHER PUBLICATIONS

Office Action issued Jan. 20, 2017, in Russian Application No. 2014153662/05 filed Jun. 3, 2013 (w/Russian Search Report).

Silvia Bordiga et al., FTIR Adsorption Studies of H2O and CH3OH in the Isostructural H-SSZ-13 and H-SAPO-34: Formation of H-Bonded Adducts and Protomated Clusters, J. Phys. Chem. B 2005, 109, pp. 7724-7732, 2005, published on the web Apr. 6, 2005.†

Hee-Yong Jeon et al., Catalytic evaluation of small-pore molecular sieves with different framework topologies for the synthesis of methylamines, Applied Catalysis A, General, 305, 2006 pp. 70-78 available online Mar. 29, 2006.†

T.V. Harris and S.I. Zones, A Study of Guest/Host Energetics for the Synthesis of Cage Structures NON and CHA, Zeolites and Related Microporous Materials State of the Art 1994, Studies in Surface Science and Catalysis, pp. 29-36, vol. 84, 1994.†

† cited by third party

CHA-TYPE ZEOLITE MATERIALS AND METHODS FOR THEIR PREPARATION USING CYCLOALKYAMMONIUM COMPOUNDS

CROSS-REFERENCE TO RELATED APPLICATIONS

This application claims priority to U.S. Provisional Application Ser. No. 61/654,989, filed Jun. 4, 2012 the disclosure of which are hereby incorporated by reference in its entirety.

TECHNICAL FIELD

Aspects of the invention relate to a process for the preparation of a zeolitic material as well as to a zeolitic material having the CHA-type framework structure as such and as obtainable from the inventive process. Furthermore, aspects of the invention relate to the use of the inventive zeolitic materials in specific applications.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, London, England (2001).

Among said zeolitic materials, Chabazite is a well studied example, wherein it is the classical representative of the class of zeolitic materials having a CHA framework structure. Besides aluminosilicates such as Chabazite, the class of zeolitic materials having a CHA framework structure comprises a large number of compounds further comprising phosphorous in the framework structure are known which are accordingly referred to as silicoaluminophosphates (SAPO). In addition to said compounds, further molecular sieves of the CHA structure type are known which contain aluminum and phosphorous in their framework, yet contain little or no silica, and are accordingly referred to as aluminophosphates (APO). Zeolitic materials belonging to the class of molecular sieves having the CHA-type framework structure are employed in a variety of applications, and in particular serve as heterogeneous catalysts in a wide range of reactions such as in methanol to olefin catalysis and selective catalytic reduction of nitrogen oxides $NO_x$ to name some two of the most important applications. Zeolitic materials of the CHA framework type are characterized by three-dimensional 8-membered-ring (8MR) pore/channel systems containing double-six-rings (D6R) and cages.

Zeolitic materials having a CHA-type framework structure and in particular Chabazite with incorporated copper ions (Cu-CHA) are widely used as heterogeneous catalyst for the selective catalytic reduction (SCR) of $NO_x$ fractions in automotive emissions. Based on the small pore openings and the alignment of the copper ions in the CHA cages, these catalyst systems have a unique thermal stability, which tolerates temperatures higher than 700° C. in presence of $H_2O$.

For the industrial production of CHA, cost intensive 1-adamantyltriemethylammoniumhydroxid among other expensive organotemplates are typically employed as structure directing agent in the synthetic procedures for their preparation. U.S. Pat. No. 4,544,538 for example relates to the production of SSZ-13 using 1N-alkyl-3-quinuclidinol, N,N,N-tetraalkyl-1-adamantammonium, or N,N,N-trialkyl-exo-aminonorbornane as the structure directing agent, the SSZ-13 zeolitic material having a CHA-type framework structure.

WO-A-2008/083048, on the other hand, concerns a method for the production of SSZ-13 using a specific N,N,N-trimethyl benzyl quaternary ammonium cation in the presence of seed crystals. Similarly, WO-A-2008/039742 relates to a method for the production of SSZ-13 wherein a mixture of N,N,N-trialkyl benzyl quaternary ammonium cations and N,N,N-tetramethyl-1-adamantammonium are employed as the organotemplate in an effort for increasing cost-effectiveness by attempting to reduce the amount of the cost-intensive N,N,N-tetramethyl-1-adamantammonium usually employed in the synthesis of SSZ-13.

WO-A-2008/033229, concerns a method for the production of microporous materials using dicycloalkylammonium compounds as organic templating agents.

U.S. Pat. No. 4,610,854 discloses the use of trimethylcyclohexylammonium for the production of SSZ-15, which is a zeolitic material displaying a framework structure other than the CHA-type. US-A-2007/0043249, on the other hand, relates to the use of a group of tetraalkylammonium compounds including trimethylcyclohexylammonium as organotemplates for the production of zeolitic materials having the CHA framework structure, wherein said materials are however restricted to alumino- or silicoaluminophosphates necessarily containing $P_2O_5$ in their respective frameworks.

Consequently, there remains a need for a cost-effective process for the production of zeolitic materials having the CHA-type framework structure. Furthermore, there is an ongoing need for improved zeolitic materials having the CHA-type framework structure, in particular with respect to the catalytic properties for use in a variety of application and in particular for use in the treatment of $NO_x$ in automotive exhaust gas a catalyst and/or catalyst support. This applies in particular in view of national legislation and environmental policy which require increasing effectiveness of environmental catalysts such as Cu-Chabazite and related zeolitic materials.

DETAILED DESCRIPTION

Figure 1:
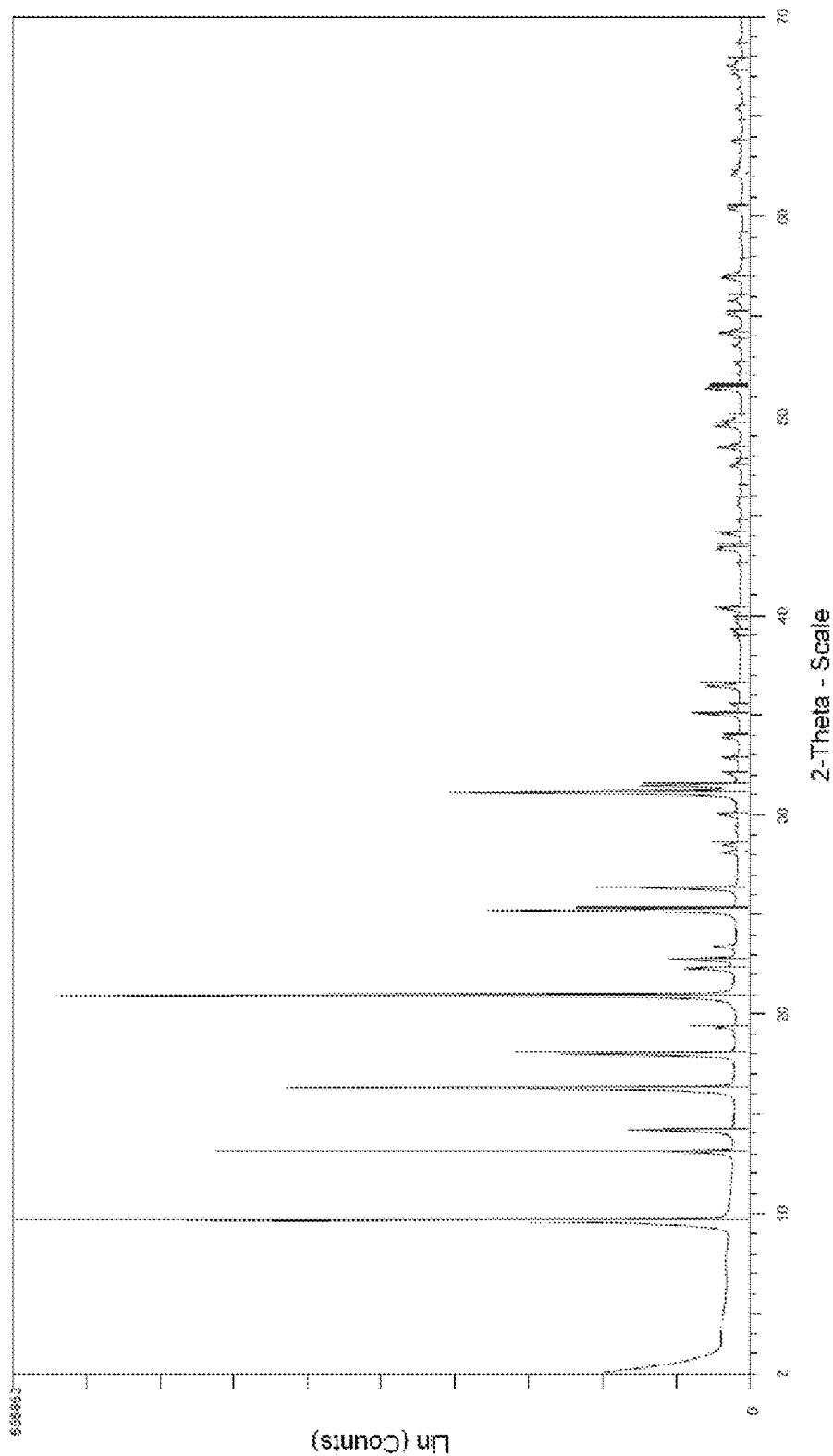
FIGS. 1, 2a, 3a, 4a, and 5a show the X-ray diffraction patterns (measured using Cu K alpha-1 radiation) of crystalline materials according to one or more embodiments of the invention.

One or more aspects of the invention provides an improved CHA-type zeolitic material, as well as to provide an improved method for the production of such a catalyst, in particular in view of cost-effectiveness. Thus it has surprisingly been found that an improved CHA-type zeolite may be obtained by using specific cycloalkylammonium compounds as organotemplates in the self-organizing synthetic procedures typical of zeolite chemistry. Furthermore, it has quite unexpectedly been found that besides providing an improved zeolitic material according to one or more embodiments of the invention, the use of the cycloalkylammonium compounds affords a highly improved process for the production of said zeolitic materials, in particular with respect to the considerable increase in cost-effectiveness which may be achieved in view of the facile synthesis of one or more of the organotemplate materials of the invention starting from inexpensive precursor compounds. This is in contrast to the methods known in the art for the production of zeolitic materials having the CHA-type framework structure which employ expensive organotemplates necessitating elaborate procedures for the synthesis.

Therefore, aspects of the invention relates to a process for the preparation of a zeolitic material having a CHA-type framework structure comprising $YO_2$ and $X_2O_3$, wherein said process comprises the steps of:

(1) providing a mixture comprising one or more sources for $YO_2$, one or more sources for $X_2O_3$, and one or more tetraalkylammonium cation $R^1R^2R^3R^4N^+$-containing compounds as structure directing agent;

(2) crystallizing the mixture obtained in step (1) for obtaining a zeolitic material having a CHA-type framework structure;

wherein Y is a tetravalent element and X is a trivalent element, wherein $R^1$, $R^2$, and $R^3$ independently from one another stand for alkyl, wherein $R^4$ stands for cycloalkyl, and wherein the mixture provided in step (1) does not contain any substantial amount of a source for $Z_2O_5$, wherein Z is P, preferably P and As, wherein more preferably Z is any pentavalent element which is a source for $Z_2O_5$ in the CHA-type framework structure crystallized in step (2).

Thus, it has surprisingly been found that by using a cycloalkylammonium cation according to the inventive process as structure directing agent, a highly cost-effective process is provided, wherein even more unexpectedly, said improved process actually leads to an improved zeolitic material having the CHA-type framework structure compared to materials obtained by using other organotemplates in their respective synthetic procedures. Thus, as compared to the cost-intensive organotemplate materials used in the prior art, the cycloalkylammonium organotemplate compounds may be obtained according to facile synthetic procedures departing from inexpensive materials. For example, considering a particularly preferred embodiment of the invention wherein trimethylcyclohexylammoniumhydroxid is employed as the organotemplate compound, said structure directing agent may for example be obtained according to a facile procedure involving the alkylation of aniline, which results in much lower raw material and production costs than in the organic synthesis of for example 1-adamantyltriemethylammoniumhydroxid used in the prior art synthetic methodologies.

Furthermore, as mentioned in the foregoing, it has quite unexpectedly been found that the zeolitic materials having the CHA-type framework structure obtained from the inventive process displays improved characteristics which clearly contrast to those observed for the prior art CHA-type zeolitic materials. This is particularly apparent from the different physical and chemical properties obtained for the resulting materials which clearly distinguish them from those known from the prior art, as a result of which improved properties may be obtained such as for example in catalysis, and more particularly in environmental catalysis, which constitutes a highly important technical field in which CHA-type zeolitic materials are employed.

As used herein, the term "substantial" with respect to the amount of a source for $Z_2O_5$ being contained in the mixture provided in step (1) and crystallized in step (2) according to particular and preferred embodiments of the inventive process, this preferably indicates an amount of 5 wt.-% or less of $Z_2O_5$ contained in a source for $Z_2O_5$ and based on 100 wt-% of $YO_2$ contained in the one or more sources for $YO_2$, and more preferably indicates an amount of 1 wt.-% or less, more preferably of 0.5 wt.-% or less, more preferably of 0.1 wt.-% or less, more preferably of 0.05 wt.-% or less, more preferably of 0.01 wt.-% or less, more preferably of 0.005 wt.-% or less, more preferably of 0.001 wt.-% or less, more preferably of 0.0005 wt.-% or less, and even more preferably of 0.0001 wt.-% or less of $Z_2O_5$ contained in a source for $Z_2O_5$ based on 100 wt-% of $YO_2$ contained in the one or more sources for $YO_2$.

According to the invention process, one or more sources for $YO_2$ are provided in step (1), wherein said one or more sources may be provided in any conceivable form provided that a zeolitic material comprising $YO_2$ and $X_2O_3$ and having the CHA-type framework structure is crystallized in step (2). Preferably, $YO_2$ is provided as such and/or has a compound which comprises $YO_2$ as a chemical moiety and/or as a compound which (partly or entirely) is chemically transformed to $YO_2$ during the inventive process.

As regards $YO_2$ and/or precursors thereof employed in the inventive process, there is no particular restriction as to the one or more elements for which Y stands, provided that said element is a tetravalent element and that it is comprised in the zeolitic material crystallized in step (2). In particular, as used herein, $YO_2$ is at least partially and preferably entirely comprised in the framework structure of the zeolitic material as structure building element, as opposed to non-framework elements which can be present in the pores and cavities formed by the framework structure and typical for zeolitic materials in general. Thus, taking into account the aforementioned, Y may stand for any conceivable tetravalent element, Y standing either for a single or several tetravalent elements. Preferred tetravalent elements according to one or more embodiments of the invention include Si, Sn, Ti, Zr, Ge, as well as combinations of any two or more thereof. According to preferred embodiments of the invention, Y stands for Si and/or Sn, wherein according to particularly preferred embodiments of the present invention, Y comprises Si and even more preferably Y is Si.

In preferred embodiments of the present invention, wherein Y stands for Si or for a combination of Si with one or more further tetravalent elements, the source for $SiO_2$ preferably provided in step (1) can also be any conceivable source. Thus, by way of example, any type of silicas and/or silicates and/or silica derivatives may be used, wherein preferably the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, pyrogenic silica, silicic acid esters, or mixtures of any two or more of the afore-mentioned compounds may equally be used. According to particularly preferred embodiments, the one or more sources for $YO_2$ used in step (1) of the inventive process are selected from the group consisting of fumed silica, silica hydrosols, reactive amorphous solid silicas, silica gel, silicic acid, colloidal silica, silicic acid esters, and mixtures of two or more thereof. According to said particularly preferred embodiments, it is further preferred that the one or more sources for $YO_2$ are selected from the group consisting of fumed silica, silica hydrosols, reactive amorphous solid silicas, silica gel, colloidal silica, and mixtures of two or more thereof, wherein even more preferably according to the inventive process, the one or more sources for $YO_2$ comprises fumed silica and/or colloidal silica.

Regarding the one or more tetraalkylammonium cations, $R^1R^2R^3R^4N^+$ further provided in the mixture according to step (1) of the inventive process, there is no particular restriction as to the type and/or amount thereof provided that $R^1$, $R^2$, and $R^3$ stand for alkyl and $R^4$ stands for a cycloalkyl moiety, provided that the type and/or amount thereof which is provided in step (1) allows for the crystallization of a zeolitic material having the CHA-type framework structure in step (2). Thus, regarding the alkyl moieties $R^1$, $R^2$, and $R^3$ of the one or more tetraalkylammonium cations $R^1R^2R^3R^4N^+$ provided in step (1) of the inventive process, these may, by way of example, independently from one another stand for optionally substituted and/or optionally branched $(C_1-C_6)$alkyl. According to one or more embodiments of the present invention, $R^1$, $R^2$, and $R^3$ may be the same, or two of $R^1$, $R^2$, and $R^3$ may be the same and one different from the others, or $R^1$, $R^2$, and $R^3$ may each be different from one another, wherein it is preferred that at least two of $R^1$, $R^2$, and $R^3$ are the same alkyl moiety, and wherein even more preferably $R^1$, $R^2$, and $R^3$ are the same alkyl moiety according to particular embodiments of the present invention. As regards preferred embodiments of the present invention, $R^1$, $R^2$, and $R^3$ independently from one another stand for optionally substituted and/or optionally branched $(C_1-C_5)$alkyl, wherein more preferably $R^1$, $R^2$, and $R^3$ are independently from one another selected from the group consisting of $(C_1-C_4)$alkyl, more preferably $(C_1-C_3)$alkyl, wherein even more preferably $R^1$, $R^2$, and $R^3$ independently form one another stand for optionally substituted methyl or ethyl. According to particularly preferred embodiments of the present invention, at least one, preferably two, and even more preferably all of $R^1$, $R^2$, and $R^3$ stand for optionally substituted methyl, preferably for unsubstituted methyl.

Therefore, as concerns the one or more tetraalkylammonium cations $R^1R^2R^3R^4N^+$ further provided in the mixture according to step (1) of the inventive process, it is preferred according to one or more embodiments of the present invention that $R^1$, $R^2$, and $R^3$ independently from one another stand for optionally substituted and/or optionally branched $(C_1-C_6)$alkyl, preferably $(C_1-C_5)$alkyl, more preferably $(C_1-C_4)$alkyl, more preferably $(C_1-C_3)$alkyl, and even more preferably for optionally substituted methyl or ethyl, wherein even more preferably $R^1$, $R^2$, and $R^3$ stand for optionally substituted methyl, preferably unsubstituted methyl.

As regards the cycloalkyl moiety $R^4$ of the one or more tetraalkylammonium cations $R^1R^2R^3R^4N^+$ provided in step (1) of the inventive process, $R^4$ may stand for any suitable cycloalkyl group and is preferably cycloalkyl selected from the group consisting optionally heterocyclic and/or optionally substituted cycloalkyl. As regards the number of chain members forming the optionally heterocyclic cycloalkyl moiety, no particular restriction applies in one or more embodiments of the present invention, provided that a zeolitic material having a CHA-type framework structure may be crystallized in step (2) of the inventive process. Thus, by way of example, the optionally heterocyclic cycloalkyl moiety may be formed from any suitable number of chain members, wherein it is preferred that the ring moiety is formed from optionally heterocyclic 5- to 8-membered cycloalkyl, more preferably 5- to 7-membered cycloalkyl, more preferably 5- or 6-membered cycloalkyl, wherein even more preferably the optionally heterocyclic cycloalkyl is a 6-membered cycloalkyl. As regards the moieties by which the optionally heterocyclic cycloalkyl moieties according to one or more embodiments of the present invention may be substituted, there is again no particular restriction in this respect provided that a zeolitic material having a CHA-type framework structure may be crystallized in step (2). Thus, by way of example, the one or more optional substituents of the optionally heterocyclic moiety may be selected from the group consisting of $(C_1-C_3)$alkyl, $(C_1-C_3)$alkoxy, hydroxyl, halides, $(C_1-C_3)$carboxyl, $(C_1-C_3)$carbonyl, $(C_1-C_3)$amine and combinations of two or more thereof, preferably from the group consisting of $(C_1-C_2)$alkyl, $(C_1-C_2)$alkoxy, hydroxyl, chloro, bromo, fluoro, and combinations of two or more thereof, more preferably from the group consisting of methyl, hydroxyl, chloro, and combinations of two or more thereof, wherein even more preferably the one or more optional substituents is methyl and/or hydroxo, preferably methyl. As regards the number of substituents which are present on the optionally heterocyclic cycloalkyl moiety according to particular embodiments of the present invention, their number may range anywhere from 1 to 4, wherein preferably from 1 to 3 substituents are present on the optionally heterocyclic cycloalkyl, more preferably 1 or 2, wherein even more preferably one substituent is present on the optionally heterocylic cycloalkyl moiety of $R^4$ according to particular embodiments of the present invention. According to one or more embodiments of the present invention, it is however particularly preferred that $R^4$ stands for optionally heterocyclic cycloalkyl which is unsubstituted, and even more preferably for cyclohexyl.

Regarding the heteroatom which may be present in embodiments of the present invention wherein $R^4$ is an optionally substituted heterocyclic cycloalkyl, no particular restriction applies according to the present invention, neither with respect to the type of heteroatoms which may be present in the heterocyclic cycloalkyl moiety, nor with respect to their number, provided that a zeolitic material having the CHA-type framework structure may be crystallized in step (2). Thus, by way of example, the one or more heteroatoms comprised in the heterocyclic cycloalkyl may comprise one or more elements selected from the group consisting of N, O, S, Se, P, Cl, Br, I, and combinations of two or more thereof, wherein preferably the one or more heteroatoms comprise one or more elements selected from the group consisting of N, O, S, Se, P, and combinations of two or more thereof, more preferably from the group consisting of N, O, S, and combinations of two or three thereof, wherein even more preferably the one or more heteroatoms comprise N and/or O, preferably O. As regards the number of heteroatoms which are contained as chain members of the heterocyclic cycloalkyl according to particular embodiments of the present invention, their number may range anywhere from 1 to 4, wherein preferably from 1 to 3 heteroatoms are present in the heterocyclic cycloalkyl, more preferably 1 or 2, wherein even more preferably one heteroatom is contained in the heterocylic cycloalkyl moiety of $R^4$ according to particular embodiments of the present invention. It is, however, particularly preferred according to the present invention that the cycloalkyl moiety $R^4$ of the one or more tetraalkylammonium cation $R^1R^2R^3R^4N^+$-containing compounds provided in step (1) of the inventive process is cycloalkyl which does not contain a heteroatom, preferably cyclohexyl.

Therefore, as concerns the one or more tetraalkylammonium cations $R^1R^2R^3R^4N^+$ further provided in the mixture according to step (1) of the inventive process, one or more embodiments of the present invention that $R^4$ stands for optionally heterocyclic and/or optionally substituted 5- to 8-membered cycloalkyl, preferably for 5- to 7-membered cycloalkyl, more preferably for 5- or 6-membered cycloalkyl, wherein even more preferably $R^4$ stands for optionally heterocyclic and/or optionally substituted 6-membered cycloalkyl, preferably optionally substituted cyclohexyl, and more preferably non-substituted cyclohexyl.

Furthermore, according to particularly preferred embodiments of the inventive process, the one or more tetraalkylammonium cation $R^1R^2R^3R^4N^+$-containing compounds comprise one or more N,N,N-tri($C_1$-$C_4$)alkyl-($C_5$-$C_7$)cycloalkylammonium compounds, preferably one or more N,N,N-tri($C_1$-$C_3$)alkyl-($C_5$-$C_6$)cycloalkylammonium compounds, more preferably one or more N,N,N-tri($C_1$-$C_2$)alkyl-($C_5$-$C_6$)cycloalkylammonium compounds, more preferably one or more N,N,N-tri($C_1$-$C_2$)alkyl-cyclopentylammonium and/or one or more N,N,N-tri($C_1$-$C_2$)alkyl-cyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein it is even more preferred according to the inventive process that the one or more tetraalkylammonium cation $R^1R^2R^3R^4N^+$-containing compounds comprise one or more N,N,N-trimethyl-cyclohexylammonium compounds, wherein it is even further preferred that the one or more tetraalkylammonium cation $R^1R^2R^3R^4N^+$-containing compounds provided in step (1) of the inventive process consists of one or more N,N,N-trimethyl-cyclohexylammonium compounds, even more preferably of a single N,N,N-trimethyl-cyclohexylammonium compound.

According to one or more embodiments of the present invention, there is no particular restriction as to the type of the one or more tetraalkylammonium cations $R^1R^2R^3R^4N^+$-containing compounds which may be provided in step (1) of the inventive process provided that the one or more tetraalkylammonium cations $R^1R^2R^3R^4N^+$ contained therein may act as structure directing agent upon crystallization of the reaction mixture in step (2) of the inventive process. According to preferred embodiments, the one or more tetraalkylammonium cations $R^1R^2R^3R^4N^+$-containing compounds contain one or more salts. In principle, according to said preferred embodiments, there is no particular restriction as to the counter ion to the one or more tetraalkylammonium cations $R^1R^2R^3R^4N^+$, again provided that these allow for the crystallization of a zeolitic material having a CHA-type framework structure in step (2) of the inventive process by the structure directing action of one or more of the aforementioned tetraalkylammonium cations $R^1R^2R^3R^4N^+$. Thus, by way of example, the one or more tetraalkylammonium cations $R^1R^2R^3R^4N^+$-containing compounds may comprise one or more salts selected from halides, hydroxides, sulfates, nitrates, phosphates, acetates, and mixtures of two or more thereof. As regards the halide salts, these are preferably chloride and/or bromide salts, wherein even more preferably chloride salts are employed. According to preferred embodiments of the present invention, the one or more tetraalkylammonium compounds comprise one or more one of more salts selected from the group consisting of chlorides, hydroxides, sulfates, and mixtures of two or more thereof, wherein more preferably the one or more tetraalkylammonium cation $R^1R^2R^3R^4N^+$-containing compounds are tetraalkylammonium hydroxides and/or chlorides. According to particularly preferred embodiments, the one or more tetraalkylammonium cations $R^1R^2R^3R^4N^+$-containing compounds are provided as their hydroxide salts in step (1) of the inventive process.

Thus, according to particularly preferred embodiments of the inventive process which are further preferred, the one or more tetraalkylammonium cation $R^1R^2R^3R^4N^+$-containing compounds provided in step (1) comprise one or more compounds selected from the group consisting of N,N,N-tri($C_1$-$C_4$)alkyl-($C_5$-$C_7$)cycloalkylammonium hydroxides, preferably of N,N,N-tri($C_1$-$C_3$)alkyl-($C_5$-$C_6$)cycloalkylammonium hydroxides, more preferably of N,N,N-tri($C_1$-$C_2$)alkyl-($C_5$-$C_6$)cycloalkylammonium hydroxides, more preferably of N,N,N-tri($C_1$-$C_2$)alkyl-cyclopentylammonium and/or N,N,N-tri($C_1$-$C_2$)alkyl-cyclohexylammonium hydroxides, wherein it is yet further preferred that the one or more tetraalkylammonium cation $R^1R^2R^3R^4N^+$-containing compounds is selected from N,N,N-triethyl-cyclohexylammonium hydroxide, N,N-diethyl-N-methyl-cyclohexylammonium hydroxide, N,N-dimethyl-N-ethyl-cyclohexylammonium hydroxide, N,N,N-trimethyl-cyclohexylammonium hydroxide, and mixtures of two or more thereof. According to one or more embodiments of the present invention which are even further preferred, the one or more tetraalkylammonium cation $R^1R^2R^3R^4N+$-containing compounds comprise N,N,N-trimethyl-cyclohexylammonium hydroxide, wherein even more preferably the tetraalkylammonium cation $R^1R^2R^3R^4N^+$-containing compound provided in step (1) is N,N,N-trimethyl-cyclohexylammonium hydroxide.

As regards the amount in which the one or more tetraalkylammonium cations $R^1R^2R^3R^4N^+$ which may be provided in the mixture in step (1) of the inventive process, again there is no particular restriction in this respect provided that a zeolitic material having a CHA-type framework structure may be crystallized in step (2) of the inventive process. Thus, by way of example, the molar ratio of the one or more tetraalkylammonium cations $R^1R^2R^3R^4N^+$:$YO_2$ provided in the mixture may range anywhere from 0.01 to 5, wherein preferably the molar ratio is comprised in the range of from 0.05 to 3, more preferably from 0.1 to 1.5, more preferably from 0.3 to 1, more preferably from 0.4 to 0.8, and even more preferably from 0.45 to 0.75. According to particularly preferred embodiments of the present invention, the molar ratio of the one or more tetraalkylammonium cations $R^1R^2R^3R^4N^+$:$YO_2$ provided in the mixture according to step (1) is comprised in the range of from 0.5 to 0.7.

According to one or more embodiments of the present invention the mixture provided in step (1) further comprises one or more sources for $X_2O_3$, wherein X is a trivalent element. As regards the elements which may be employed as the trivalent element X comprised in the one or more sources for $X_2O_3$ provided in step (1), there is no particular restriction according to the present invention as to which elements or element mixtures may be employed, provided that a zeolitic material having a CHA-type framework structure is crystallized in step (2) comprising $YO_2$ and $X_2O_3$ as framework elements. According to preferred embodiments of the present invention, X is selected from the group consisting of Al, B, In, Ga, and mixtures of two or more thereof, wherein preferably X is Al and/or B. According to particularly preferred embodiments of the present invention, X comprises Al, wherein even more preferably X is Al.

According to some embodiments of the present invention wherein the mixture in step (1) comprises one or more sources for $X_2O_3$ it is preferred in instances wherein one or more sources of $Al_2O_3$ is contained in the mixture that said one or more sources comprises one or more compounds selected from aluminum, aluminum alkoxides, alumina, aluminates, aluminum salts, and mixtures of two or more thereof, wherein the aluminates are preferably one or more aluminate salts selected from the group consisting of alkali metal aluminates, aluminum hydroxide, and mixtures of two or more thereof, more preferably one or more aluminate salts selected from aluminum hydroxide, alkali metal aluminates, and mixtures of two or more thereof, the alkali metal preferably being sodium and/or potassium, and more preferably being sodium. Alternatively, according to embodiments wherein the one or more sources for $X_2O_3$ comprise aluminum, it is preferred that said one or more sources comprise aluminum powder. Furthermore, according to embodiments wherein the one or more sources for $X_2O_3$ comprise one or more aluminum alkoxides, there is no particular restriction as to the alkoxide substituents contained therein, provided that a zeolitic material may be crystallized in step (2) of the inventive process. Thus, by way of example, one or more aluminum alkoxides may be employed selected from the group consisting of ($C_1$-$C_5$) alkoxides, preferably ($C_1$-$C_4$)alkoxides, more preferably ($C_2$-$C_3$)alkoxides, and even more preferably branched $C_3$-alkoxides, wherein even more preferably the one or more sources for $X_2O_3$ comprises aluminum triisopropylate.

It is particularly preferred according to one or more embodiments of the present invention that the one or more sources for $X_2O_3$ comprises one or more compounds selected from the group consisting of alumina, aluminum salts, and mixtures of two or more thereof, more preferably from the group consisting of alumina, AlO(OH), Al(OH)$_3$, aluminum halides, preferably aluminum fluoride and/or chloride and/or bromide, more preferably aluminum fluoride and/or chloride, and even more preferably aluminum chloride, aluminum sulfate, aluminum phosphate, aluminum fluorosilicate, and mixtures of two or more thereof, more preferably from the group consisting of AlO(OH), Al(OH)$_3$, aluminum chloride, aluminum sulfate, aluminum phosphate, and mixtures of two or more thereof, more preferably from the group consisting of AlO(OH), Al(OH)$_3$, aluminum chloride, aluminum sulfate, and mixtures of two or more thereof. According to particularly preferred embodiments of the inventive process, the one or more sources for $X_2O_3$ comprises AlO(OH) and/or aluminum sulfate, and even more preferably aluminum sulfate.

0.5 to 500, preferably from, more preferably from, more preferably from 20 to 100, more preferably from 30 to 80, more preferably from 40 to 60, and even more preferably from 45 to 55.

As regards embodiments of the present invention wherein one or more sources for $X_2O_3$ are provided in step (1), no particular restriction applies according to the present invention neither regarding the type of the one or more sources for $X_2O_3$, nor with respect to amounts in which they are used. Thus, by way of example, relative to the amount of the one or more sources for $YO_2$ provided in the mixture of step (1), the $YO_2$:$X_2O_3$ molar ratio of the mixture may range anywhere from 0.5 to 500, wherein preferably molar ratios are provided comprised in the range of from 1 to 200, more preferably from 5 to 150, more preferably from 20 to 100, more preferably from 30 to 80, and even more preferably of from 40 to 60. According to particularly preferred embodiments, the $YO_2$:$X_2O_3$ molar ratio of the mixture provided in step (1) is comprised in the range of from 45 to 55.

According to the process of one or more embodiments of the present invention, seed crystals may optionally be provided in step (1), wherein said seed crystals preferably comprise a zeolitic material of the same type of framework structure as obtained from crystallization in step (2), wherein more preferably the seed crystals comprise a zeolitic material as obtained according to the inventive process. According to particularly preferred embodiments, the seed crystals comprise one or more zeolitic materials having a CHA-type framework structure. According to said preferred embodiments, the seed crystals may comprise any zeolitic material having a CHA-type framework structure, provided that a zeolitic material is crystallized in step (2), which is preferably a zeolitic material having the CHA-type framework structure, wherein more preferably the zeolitic material having a CHA-type framework structure comprised in the seed crystals is a zeolitic material obtained according to the inventive process, and wherein even more preferably the zeolitic material having a CHA-type framework structure comprised in the seed crystals is the same as the zeolitic material having a CHA-type framework structure which is then crystallized in step (2). Particularly preferred according to one or more embodiments of the present invention are seed crystals comprising one or more zeolites selected from the group consisting of (Ni(deta)$_2$)-UT-6, Chabazite, |Li—Na| [Al—Si—O]-CHA, DAF-5, Dehyd. Na-Chabazite, K-Chabazite, LZ-218, Linde D, Linde R, Phi, SSZ-62, UiO-21, Willhendersonite, ZK-14, ZYT-6, and mixtures of two or more thereof, wherein more preferably the seed crystals comprise one or more zeolites selected from the group consisting of (Ni(deta)$_2$)-UT-6, Chabazite, |Li—Na| [Al—Si—O]-CHA, DAF-5, Dehyd. Na-Chabazite, K-Chabazite (Iran), LZ-218, Linde D, Linde R, Phi, SSZ-62, UiO-21, Willhendersonite, ZK-14, ZYT-6, and mixtures of two or more thereof, and wherein even more preferably the seed crystals comprise Chabazite. According to an even more preferred embodiments Chabazite is employed as seed crystals in the inventive process, wherein preferably said Chabazite seed crystals are either obtainable according to the inventive process or have been obtained according to said process.

According to the inventive process, any suitable amount of seed crystals can be provided in the mixture according to step (1), provided that a zeolitic material is crystallized in step (2). In general, the amount of seed crystals contained in the mixture according to step (1) ranges from 0.1 to 20 wt.-% based on 100 wt.-% of $YO_2$ in the at least one source for $YO_2$, preferably from 0.3 to 10 wt.-%, more preferably from 0.5 to 5 wt.-%, and even more preferably from 1 to 3 wt.-%. According to particularly preferred embodiments of the inventive process, from 1.5 to 2.5 wt.-% of seed crystals according to any of the particular and preferred embodiments of the present invention are employed, based on 100 wt.-% of $YO_2$ in the at least one source for $YO_2$ provided in step (1) of the inventive process.

As regards the preferred embodiments of the present invention in which seed crystals are employed, there is no particular restriction as to the amount of the one or more tetraalkylammonium cations $R^1R^2R^3R^4N^+$ which may be provided in the mixture in step (1) of the inventive process provided that a zeolitic material having a CHA-type framework structure may be crystallized in step (2). Thus, the molar ratio of the one or more tetraalkylammonium cations $R^1R^2R^3R^4N^+$:$YO_2$ provided in the mixture in step (1) may be comprised in any of the particular range and preferred ranges as defined in one or more embodiments of the present invention. It is, however, particularly preferred according to one or more embodiments of the present invention that for embodiments in which seed crystals are provided in step (1) in addition to the one or more tetraalkylammonium cation $R^1R^2R^3R^4N^+$-containing compounds that the molar ratio of said one or more tetraalkylammonium cations $R^1R^2R^3R^4N^+$: $YO_2$ is comprised in the range of from 0.01 to 2, wherein more preferably the molar ratio is comprised in the range of from 0.03 to 1, more preferably from 0.05 to 0.5, more preferably from 0.1 to 0.3, and even more preferably from 0.15 to 0.25. According to particularly preferred embodiments of the present invention, the molar ratio of the one or more tetraalkylammonium cations $R^1R^2R^3R^4N^+$:$YO_2$ provided in the mixture according to step (1) is comprised in the range of from 0.18 to 0.22.

In step (1) according to one or more embodiments of the present invention, the mixture can be prepared by any conceivable means, wherein mixing by agitation is preferred, preferably by means of stirring.

In preferred embodiments of the inventive process, the mixture provided in step (1) further comprises one or more solvents. According to the inventive process, there is no particular restriction whatsoever neither with respect to the type and/or number of the one or more solvents, nor with respect to the amount in which they may be used in the inventive process provided that a zeolitic material having the CHA-type framework structure may be crystallized in step (2). According to the inventive process it is however preferred that the one or more solvents comprise water, and more preferably distilled water, wherein according to particularly preferred embodiments distilled water is used as the only solvent in the mixture provided in step (1).

As noted above, in preferred embodiments of the inventive process wherein one or more solvents are employed, there is no particular restriction as to the amount in which they may be used, wherein in particularly preferred embodiments employing water and more preferably distilled water, the $H_2O$:$YO_2$ molar ratio of the mixture may range by way of example anywhere from 3 to 50, wherein preferably the molar ratio employed is comprised in the range of from 4 to 30, more preferably of from 4.5 to 20, more preferably of from 5 to 15, and even more preferably of from 5.5 to 12. According to particularly preferred embodiments of the present invention wherein water and preferably distilled water is comprised among the one or more solvents provided in step (1) and even more preferably is the sole solvent used in the reaction mixture crystallized in step (2), the $H_2O$:$YO_2$ molar ratio is comprised in the range of from 6 to 10.

According to embodiments of the present invention which are alternatively preferred, the $H_2O$:$YO_2$ molar ratio of the mixture provided in step (1) is comprised in the range of from 3 to 100, wherein preferably the molar ratio employed is comprised in the range of from 5 to 50, more preferably of from 6 to 30, more preferably of from 7 to 20, and even more preferably of from 8 to 15. According to particularly preferred embodiments of the present invention wherein water and preferably distilled water is comprised among the one or more solvents provided in step (1) and even more preferably is the sole solvent used in the reaction mixture crystallized in step (2), the $H_2O$:$YO_2$ molar ratio is comprised in the range of from 9 to 12.

Concerning the further elements or compounds which may be contained in the mixture provided in step (1), there is no particular restriction according to the present invention in this respect, provided that a zeolitic material having the CHA-type framework structure may be obtained in step (2) of the inventive process. Thus, according to particular embodiments of the present invention, the mixture provided in step (1) may comprise one or more alkali metals M, wherein within the meaning of the present invention, the one or more alkali metals M preferably stands one or more elements selected from the group consisting of Li, Na, K, Rb, Cs, and combinations of two or more thereof, more preferably from the group consisting of Li, Na, K, and combinations of two or more thereof, wherein even more preferably the one of more alkali metals M stand for Na and/or K, and even more preferably for Na.

As regards particular embodiments of the present invention wherein the mixture provide in step (1) comprises one or more alkali metals M according to any of the particular and preferred meanings of the present invention, there is no particular restriction as to the amounts in which they may be contained in said mixture, provided that a zeolitic material having the CHA-type framework structure may be obtained in step (2) of the inventive process. According to particularly preferred embodiments of the present invention, however, the mixture provided in step (1) which is crystallized in step (2) contains 3 wt.-% or less of one or more alkali metals M based on 100 wt-% of $YO_2$. According to embodiments which are further preferred, the mixture provided in step (1) contains 1 wt.-% or less of one or more alkali metals M, more preferably 0.5 wt.-% or less, more preferably 0.1 wt.-% or less, more preferably 0.05 wt.-% or less, more preferably 0.01 wt.-% or less, more preferably 0.005 wt.-% or less, more preferably 0.001 wt.-% or less, more preferably 0.0005 wt.-% or less, and even more preferably 0.0001 wt.-% or less of one or more metals M based on 100 wt.-% of $YO_2$. According to particularly preferred embodiments of the present invention it is even further preferred that the mixture provided in step (1) and crystallized in step (2) contains no alkali metal M.

The present invention further comprises preferred embodiments of the inventive process wherein one or more sources of one or more elements suitable for isomorphous substitution of at least a portion of the Y atoms and/or of the X atoms in the zeolite framework structure having the CHA-type framework structure is added to the mixture according to step (1). In this respect, there is no particular restriction according to the present invention neither as to the type and/or number nor as to the amount of which said one or more sources of one or more elements suitable for isomorphous substitution may be employed. Thus, in principle, any one or more elements suitable for isomorphous substitution may be employed provided that they are at least partly incorporated into the framework structure of the zeolitic material crystallized in step (2) of the inventive process. According to preferred embodiments, the one or more elements are selected from the group consisting of B, Fe, Ti, Sn, Ga, Ge, Zr, V, Nb, Cu, Zn, Li, Be, and mixtures of two or more thereof, wherein more preferably the one or more elements are selected from the group consisting of B, Fe, Ti, Sn, Zr, Cu, and mixtures of two or more thereof. According to particularly preferred embodiments of the present invention, the one or more elements suitable for isomorphous substitution provided in step (1) comprise Fe and/or Cu, preferably Fe, wherein even more preferably the one or more elements are Fe and/or Cu. According to embodiments of the present invention which are particularly preferred, Cu is added as the element suitable for isomorphous substitution of at least a portion of the Y and/or of the X atoms in the mixture according to step (1).

As noted above, no particular restriction applies with respect to the amount of the one or more sources for isomorphous substitution preferably provided in the mixture in step (1) of the inventive process. Thus, by way of example, the molar ratio of $YO_2$ to the one or more elements suitable for isomorphous substitution in the mixture of step (1) of the inventive process may be comprised in the range of anywhere from 5 to 200, wherein it is preferred that said ratio is comprised in the range of from 10 to 100, more preferably of from 20 to 70, and even preferably of from 25 to 50. According to particularly preferred embodiments of the present invention wherein one or more elements suitable for isomorphous substitution are included in the mixture of step (1), it is preferred that the molar ratio of $YO_2$ to said one or more elements is comprised in the range of from 30 to 40.

As regards the crystallization performed in step (2) of the inventive process, no particular restriction applies according to the present invention as to the actual means employed for allowing for the crystallization of a zeolitic material from the mixture of step (1). Thus, any suitable means may be employed wherein it is preferred that the crystallization is achieved by heating of the mixture of step (1). According to said preferred embodiments, no particular restriction again applies with respect to the temperature at which said crystallization may be achieved, wherein it is preferred that the crystallization is conducted under heating at a temperature comprised in the range of from 90 to 210° C. ° C., more preferably of from 110 to 200° C., more preferably of from 120 to 190° C., and even more preferably of from 135 to 180° C. According to particularly preferred embodiments of the present invention, the preferred heating of the mixture provided in step (1) in step (2) for the crystallization of a zeolitic material is conducted at a temperature comprised in the range of from 150 to 170° C.

Concerning the heating preferably employed in step (2) of the inventive process as means for the crystallization of the zeolitic material, said heating may in principle be conducted under any suitable pressure provided that crystallization is achieved. In preferred embodiments of the present invention, the mixture according to step (1) is subjected in step (2) to a pressure which is elevated with regard to normal pressure. The term "normal pressure" as used in the context of one or more embodiments of the present invention relates to a pressure of 101,325 Pa in the ideal case. However, this pressure may vary within boundaries known to the person skilled in the art.

By way of example, this pressure can be in the range of from 95,000 to 106,000 or of from 96,000 to 105,000 or of from 97,000 to 104,000 or of from 98,000 to 103,000 or of from 99,000 to 102,000 Pa.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises water, preferably distilled water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used.

Furthermore, as regards the period in which the preferred heating in step (2) of the inventive process is conducted for crystallizing the zeolitic material, there is again no particular restriction in this respect provided that the period of heating is suitable for achieving crystallization. Thus, by way of example, the period of heating may range anywhere from 0.5 to 50 d, wherein preferably heating is conducted from 1 to 30 d, more preferably from 1.5 to 13 d, more preferably from 2 to 10 d, more preferably from 2 to 7 d, more preferably from 2.5 to 5 d, and even more preferably from 2.5 to 4.5 d. According to particularly preferred embodiments heating in step (2) of the inventive process is conducted for a period of from 2.5 to 3.5 d.

According to preferred embodiments of the present invention, wherein the mixture is heated in step (2), said heating may be conducted during the entire crystallization process or during only one or more portions thereof, provided that a zeolitic material is crystallized. Preferably, heating is conducted during the entire duration of crystallization.

Further regarding the means of crystallization in step (2) of the inventive process, it is principally possible according to one or more embodiments of the present invention to perform said crystallization either under static conditions or by means of agitating the mixture. According to embodiments involving the agitation of the mixture, there is no particular restriction as to the means by which said agitation may be performed such that any one of vibrational means, rotation of the reaction vessel, and/or mechanical stirring of the reaction mixture may be employed to this effect wherein according to said embodiments it is preferred that agitation is achieved by stirring of the reaction mixture. According to alternatively preferred embodiments, however, crystallization is performed under static conditions, i.e. in the absence of any particular means of agitation during the crystallization process.

In general, the process of one or more embodiments of the present invention can optionally comprise further steps for the work-up and/or further physical and/or chemical transformation of the zeolitic material crystallized in step (2) from the mixture provided in step (1). The crystallized material can for example be subject to any sequence of isolation and/or washing procedures, wherein the zeolitic material obtained from crystallization in step (2) is preferably subject to at least one isolation and at least one washing procedure.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5.

Furthermore, the inventive process can optionally comprise one or more drying steps. In general, any conceivable means of drying can be used. Drying procedures preferably include heating and/or applying vacuum to the zeolitic material. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 48 h, more preferably in the range of 4 to 36 hours, more preferably of from 6 to 24 h, and even more preferably of from 8 to 12 h.

In general, the optional washing and/or isolation and/or ion-exchange procedures comprised in the inventive process can be conducted in any conceivable order and repeated as often as desired.

Therefore, according to preferred embodiments of the present invention, the process for the preparation of a zeolitic material further comprises one or more of the following steps of
(3) isolating the zeolitic material, preferably by filtration, and/or
(4) washing the zeolitic material, and/or
(5) drying the zeolitic material, and/or
(6) subjecting the zeolitic material to an ion-exchange procedure,
wherein the steps (3) and/or (4) and/or (5) and/or (6) can be conducted in any order, and
wherein one or more of said steps is preferably repeated one or more times.

Thus, according to the inventive process, the zeolitic material crystallized in step (2) can optionally be subject to at least one step of an ion-exchange procedure, wherein the term "ion-exchange" according to one or more embodiments of the present invention generally refers to non-framework ionic elements and/or molecules contained in the zeolitic material which are accordingly exchanged by other ions, which are generally provided from an external source. Preferably, the non-framework ionic element comprises one or more of the one or more alkali metals M preferably comprised in the zeolitic material having a CHA-type framework structure crystallized in step (2), more preferably Na and/or K, and even more preferably Na.

In general, any conceivable ion-exchange procedure with all possible ionic elements and/or molecules can be conducted on the zeolitic material. Preferably, as ionic elements at least one cation and/or cationic element is employed which is preferably selected from the group consisting of $H^+$, $NH_4^+$, Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Mo, Fe, Co, Ni, Cu, Zn, Ag, and mixtures of two or more thereof, more preferably from the group consisting of $H^+$, $NH_4^+$, Cr, Mg, Mo, Fe, Ni, Cu, Zn, Ag, and mixtures of two or more thereof. According to particularly preferred embodiments of the present invention, the one or more cations and/or cationic elements are selected from the group consisting of Mg, Mo, Fe, Ni, Cu, Zn, Ag, and mixtures of two or more thereof. Preferably, the zeolitic material is first ion-exchanged with $H^+$ and/or $NH^{4+}$, and more preferably with $NH^{4+}$, before being subject to a further ion-exchange procedure, more preferably before being subject to ion-exchange with at least one cation and/or cationic element selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, wherein even more preferably the at least one cation and/or cationic element is selected from the group consisting of Mg, Mo, Fe, Ni, Cu, Zn, Ag, and mixtures of two or more thereof. As regards preferred embodiments of the present invention wherein the zeolitic material is first ion-exchanged with an $NH^{4+}$ before being subject to a further ion-exchange procedure, this may also be achieved by transformation of $H^+$ ions already contained in the zeolitic material into $NH^{4+}$ ions by appropriate treatment with ammonia or any precursor compound thereof. As regards the one or more ionic non-framework elements which are ion-exchanged, there is no particular restriction according to the present invention as to which ionic non-framework elements present in the zeolitic material may be ion-exchanged according to the aforementioned preferred embodiments, wherein preferably the one or more ionic non-framework elements to be exchanged comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, and even more preferably Na.

According to a further embodiment of the inventive process, the zeolitic material crystallized in step (2) is directly subject to at least one step of drying, preferably to spray drying and or spray granulation, without isolating, washing, or drying of the zeolitic material beforehand. Directly subjecting the mixture obtained from step (2) of the inventive process to a spray drying or spray granulation stage has the advantage that isolation and drying is performed in a single stage. Consequently, according to this embodiment of the present invention, an even more preferred process is provided wherein the number of post-synthesis workup steps is minimized, as a result of which the zeolitic material can be obtained from a highly simplified process.

According to a further embodiment of the present invention, the zeolitic material obtained from crystallization in step (2) is subject to at least one isolating step prior to being subject to at least one ion-exchange procedure, preferably to at least one isolating step followed by at least one washing step, and more preferably to at least one isolating step followed by at least one washing step followed by at least one drying step.

In general, the zeolitic material obtained according to the inventive process may be any conceivable zeolitic material, wherein preferably said zeolitic material formed in step (2) comprises one or more zeolites having the CHA-type framework structure. Among the preferred zeolitic materials comprising one or more zeolites having the CHA-type framework structure, there is no particular restriction neither with respect to the type and/or number thereof, nor with respect to the amount thereof in the zeolitic material. According to preferred embodiments of the present invention, the one or more zeolites having the CHA framework structure comprise one or more zeolites selected from the group consisting of (Ni(deta)$_2$)-UT-6, Chabazite, |Li—Na| [Al—Si—O]-CHA, DAF-5, Dehyd. Na-Chabazite, K-Chabazite, LZ-218, Linde D, Linde R, Phi, SSZ-62, UiO-21, Willhendersonite, ZK-14, ZYT-6, and mixtures of two or more thereof, more preferably from the group consisting of (Ni(deta)$_2$)-UT-6, Chabazite, |Li—Na| Al—Si—O]-CHA, DAF-5, Dehyd. Na-Chabazite, K-Chabazite (Iran), LZ-218, Linde D, Linde R, Phi, SSZ-62, UiO-21, Willhendersonite, ZK-14, ZYT-6, and combinations of two or more thereof, wherein even more preferably the zeolitic material formed in step (2) comprises Chabazite.

According to the inventive process, it is particularly preferred that at no point does the mixture provided in step (1) and crystallized in step (2) contain any substantial amount of an organic structure directing agent other than the one or more tetraalkylammonium cation $R^1R^2R^3R^4N^+$-containing compounds according to any of the particular and preferred embodiments of the present invention, wherein such organic structure directing agents other than the tetraalkylammonium compounds used in the inventive process preferably designate any other conceivable organotemplates which may suitably be used in the synthesis of zeolitic materials having a CHA-type framework structure either by themselves, or in combination with the one or more tetraalkylammonium cation $R^1R^2R^3R^4N^+$-containing compounds according to one or more embodiments of the present invention. According to a preferred meaning of one or more embodiments of the present invention, the organic structure directing agent other than the one or more tetraalkylammonium cation $R^1R^2R^3R^4N^+$-containing compounds designates any one or more compounds selected from dialkyl amines, and/or heterocyclic amines, including any combination of two or more thereof, wherein preferably said one or more other organic structure directing agent is selected from the group consisting of di($C_1$-$C_5$)alkyl amines, oxygen containing heteroxyclic amines with 5 to 8 ring members, and combinations of two or more thereof, more preferably from the group consisting of di($C_2$-$C_4$)alkyl amines, oxygen containing heteroxyclic amines with 5 to 7 ring members, and combinations of two or more thereof, more preferably from the group consisting of di($C_2$-$C_3$)alkyl amines, oxygen containing heteroxyclic amines with 5 or 6 ring members, and combinations of two or more thereof, and/or related organotemplates such as any suitable N-alkyl-3-quinuclidinol compound, N,N,N-trialkyl-exoaminonorbornane compound, N,N,N-trimethyl-1-adamantylammonium compound, N,N,N-trimethyl-2-adamantylammonium compound, N,N,N-trimethylcyclohexylammonium compound, N, N-dimethyl-3,3-dimethylpiperidinium compound, N,N-methylethyl-3,3-dimethylpiperidinium compound, N,N-dimethyl-2-methylpiperidinium compound, 1,3,3,6,6-pentamethyl-6-azonio-bicyclo(3.2.1)octane compound, N,N-dimethylcyclohexylamine compound, or any suitable N,N,N-trimethylbenzylammonium compound, including combinations of two or more thereof. According to particularly preferred embodiments of the present invention, the mixture provided in step (1) does not contain any substantial amount of a trimethyl benzyl ammonium containing compound, and preferably not any substantial amount of a trialkyl benzyl ammonium compound, wherein even more preferably the mixture provided in step (1) only contains one or more N,N,N-trimethyl-cyclohexylammonium compounds and preferably N,N,N-trimethyl-cyclohexylammonium hydroxide as structure directing agent for the crystallization of a zeolitic material having a CHA-type framework structure in step (2).

Therefore, it is preferred according to one or more embodiments of the present invention that the mixture provided in step (1) does not contain any substantial amount of a trimethyl benzyl ammonium containing compound, preferably of a trialkyl benzyl ammonium compound wherein preferably the mixture provided in step (1) does not contain any substantial amount of an organotemplate other than the one or more tetraalkylammonium cation $R^1R^2R^3R^4N^+$-containing compounds as structure directing agent, wherein more preferably the mixture provided in step (1) does not contain any substantial amount of a structure directing agent other than the one or more tetraalkylammonium cation $R^1R^2R^3R^4N^+$-containing compounds, and wherein even more preferably, the mixture provided in step (1) only contains one or more N,N,N-trimethyl-cyclohexylammonium compounds and preferably N,N,N-trimethyl-cyclohexylammonium hydroxide as structure directing agent for the crystallization of a zeolitic material having a CHA-type framework structure in step (2).

According to specific embodiments of the present invention, not more than an impurity of said one or more other organic structure directing agent may, however, be present in the reaction mixture, for example, as a result of said one or more other organic structure directing agents still being present in seed crystals preferably used in the inventive process. Such other organotemplates contained in seed crystal material may not, however, participate in the crystallization process since they are trapped within the seed crystal framework and therefore may not act structure directing agents within the meaning of one or more embodiments of the present invention.

As used herein, the term "substantially" as employed in the present application with respect to the amount of any one or more organotemplate other than the one or more tetraalkylammonium cation $R^1R^2R^3R^4N^+$-containing compounds as structure directing agent contained in the mixture provided in step (1) indicates an amount of 0.1 wt.-% or less of the total amount of any other one or more organotemplate, preferably 0.05 wt.-% or less, more preferably 0.001 wt.-% or less, more preferably 0.0005 wt.-% or less, and even more preferably 0.0001 wt.-% or less thereof. Said amounts of one or more other organotemplates, if at all present an any one of the materials used in the synthetic process, may also be denoted as "impurities" or "trace amounts" within the meaning of the present invention. Furthermore, it is noted that the terms "organotemplate" and "organic structure directing agent" are synonymously used in the present application.

Another aspect of the invention further relates to a zeolitic material having a CHA-type framework structure which is either obtained by the process according to one or more embodiments of the present invention or by any conceivable process which leads to a zeolitic material having a CHA-type framework structure as obtainable according to the inventive process, wherein in particular the inventive process designates any of the particular and preferred embodiments thereof as defined in the present application.

Furthermore, one or more embodiments of the present invention also relates to a synthetic zeolitic material having a CHA-type framework structure comprising $YO_2$ and $X_2O_3$, wherein Y is a tetravalent element and X is a trivalent element, said material having an X-ray diffraction pattern comprising at least the following reflections:

| Diffraction angle 2θ/° [Cu K(alpha 1)] | Intensity (%) |
|---|---|
| 9.44-9.88 | 29-92 |
| 16.03-16.55 | 32-79 |
| 17.81-18.13 | 12-42 |
| 20.62-21.30 | 100 |
| 25.02-25.42 | 25-70 |
| 30.83-31.43 | 39-73 | wherein 100% relates to the intensity of the maximum peak in the X-ray powder diffraction pattern, and wherein preferably said zeolitic material is preferably obtainable/and or obtained, and preferably obtained according to any one of the particular and preferred embodiments of the inventive process.

According to preferred embodiments of the present invention, the synthetic zeolitic material having an CHA-type framework structure has an X-ray diffraction pattern comprising at least the following reflections:

| Diffraction angle 2θ/° [Cu K(alpha 1)] | Intensity (%) |
|---|---|
| 9.55-9.77 | 34-87 |
| 16.16-16.42 | 41-69 |
| 17.89-18.05 | 15-38 |
| 20.79-21.13 | 100 |
| 25.12-25.32 | 29-66 |
| 30.98-31.28 | 42-70 | wherein again 100% relates to the intensity of the maximum peak in the X-ray powder diffraction pattern.

As regards the $^{27}$Al MAS NMR of the inventive zeolitic materials having the CHA-type framework structure comprising $X_2O_3$ wherein X includes Al or is preferably Al, there is no particular restriction as to the number and/or respective ppm values and/or respective intensities of the signals which may be comprised in the NMR spectrum. According to preferred embodiments of the present invention, however, the $^{27}$Al MAS NMR spectrum of the inventive materials comprises a first peak (P1) comprised in the range of from 52.3 to 58.6 ppm and a second peak (P2) comprised in the range of from −2.3 to −4.1 ppm, wherein the integration of the first and second peaks in the $^{27}$Al MAS NMR spectrum of the zeolitic material preferably offers a ratio of the integration values P1:P2 of 1:(0-0.22). More preferably, the first peak (P1) is comprised in the range of from 52.9 to 57.8 ppm, and the second peak (P2) is comprised in the range of from −2.5 to −3.8 ppm, wherein the integration of the first and second peaks offers a ratio of the integration values P1:P2 of 1:(0.001-0.2), more preferably of 1:(0.005-0.18). More preferably, the first peak (P1) is comprised in the range of from 53.5 to 57.0 ppm and the second peak (P2) is comprised in the range of from −2.7 to −3.6 ppm, wherein the integration of the first and second peaks offers a ratio of the integration values P1:P2 of 1:(0.01-0.15), and more preferably of 1:(0.02-0.13). According to particularly preferred embodiments of the present invention, the $^{27}$Al MAS NMR of the zeolitic material comprises a first peak (P1) comprised in the range of from 54.1 to 56.2 ppm and a second peak (P2) comprised in the range of from −2.8 to −3.4 ppm, wherein the integration of the first and second peaks in the $^{27}$Al MAS NMR of the zeolitic material preferably offers a ratio of the integration values P1:P2 of 1:(0.03-0.12).

There is no particular restriction according to the present invention as to the state in which the zeolitic material is subject to the $^{27}$Al MAS NMR experiment. It is however preferred, in particular regarding the intensity of the first and second peaks observed in the $^{27}$Al MAS NMR spectrum that the inventive zeolitic material having a CHA-type framework structure has not been subject to a dealumination treatment or even more preferably to any treatment susceptible of substantially influencing the content of framework aluminum present in the zeolitic material as-synthesized. Accordingly, according to a particularly preferred embodiment of the present invention, the $^{27}$Al MAS NMR of the zeolitic material according to any of the particular and preferred embodiments wherein X comprises Al refers to a $^{27}$Al MAS NMR spectrum and to the according values obtained therein wherein the zeolitic material has not been subject to any post-synthetic treatment and is therefore an untreated zeolitic material as-synthesized.

Therefore, embodiments of the zeolitic material having a CHA-type framework structure are preferred according to the present invention wherein the $^{27}$Al MAS NMR of the zeolitic material, and preferably of the untreated zeolitic material as-synthesized, comprises:
  a first peak (P1) in the range of from 52.3 to 58.6 ppm, preferably of from 52.9 to 57.8 ppm, more preferably of from 53.5 to 57.0 ppm, and even more preferably of from 54.1 to 56.2 ppm; and
  a second peak (P2) in the range of from −2.3 to −4.1 ppm, preferably of from −2.5 to −3.8 ppm, more preferably of from −2.7 to −3.6 ppm, and even more preferably of from −2.8 to −3.4 ppm;
wherein the integration of the first and second peaks in the $^{27}$Al MAS NMR of the zeolitic material preferably offers a ratio of the integration values P1:P2 comprised in the range of from 1:(0-0.22), more preferably of from 1:(0.001-0.2), more preferably of from 1:(0.005-0.18), more preferably of from 1:(0.01-0.15), more preferably of from 1:(0.02-0.13), and even more preferably of from 1:(0.03-0.12).

There is no particular restriction according to the present invention as to the standard used in the $^{27}$Al MAS NMR experiments for obtaining the respective values for the chemical shift in ppm in the $^{27}$Al MAS NMR spectra according to particular and preferred embodiments of the present invention, wherein preferably an external standard is used. According to particularly preferred embodiments, an aqueous 1 M solution of $AlCl_3$ is used as an external zero reference in the $^{27}$Al MAS NMR experiment.

As regards the IR-spectrum of the zeolitic material having the CHA-type framework structure according to the present invention, there is again no particular restriction as to the number and/or respective maxima and/or respective intensities of the absorption bands which may be comprised in the IR-spectrum. According to preferred embodiments of the present invention, however, the IR-spectrum of the inventive materials comprises a first absorption band (B1) comprised in the range of from 3,550 to 3,660 cm$^{-1}$, and a second absorption band (B2) comprised in the range of from 1,800 to 1,930 cm$^{-1}$, wherein the ratio of the maximum absorbance of the first absorption band to the second absorption band B1:B2 is comprised in the range of from 3.0 to 5.2. More preferably, the first absorption band (B1) is comprised in the range of from 3,580 to 3,635 cm$^{-1}$, and the second absorption band (B2) is comprised in the range of from 1,830 to 1,910 cm$^{-1}$, wherein the ratio of the maximum absorbance of the first absorption band to the second absorption band B1:B2 is comprised in the range of from 3.5 to 4.7. More preferably, the first absorption band (B1) is comprised in the range of from 3,595 to 3,620 cm$^{-1}$, and the second absorption band (B2) is comprised in the range of from 1,850 to 1,890 cm$^{-1}$, wherein the ratio of the maximum absorbance of the first absorption band to the second absorption band B1:B2 is comprised in the range of from 3.8 to 4.4. More preferably, the first absorption band (B1) is comprised in the range of from 3,600 to 3,615 cm$^{-1}$, and the second absorption band (B2) is comprised in the range of from 1,860 to 1,880 cm$^{-1}$, wherein the ratio of the maximum absorbance of the first absorption band to the second absorption band B1:B2 is comprised in the range of from 4.0 to 4.2. According to particularly preferred embodiments of the present invention, the IR-spectrum of the zeolitic material comprises a first absorption band (B1) comprised in the range of from 3,606 to 3,611 cm$^{-1}$, and a second absorption band (B2) comprised in the range of from 1,865 to 1,875 cm$^1$, wherein the ratio of the maximum absorbance of the first absorption band to the second absorption band B1:B2 is comprised in the range of from 4.03 to 4.15.

Therefore, embodiments of the inventive zeolitic material having a CHA-type framework structure are preferred wherein the IR-spectrum of the zeolitic material comprises:
  a first absorption band (B1) in the range of from 3,550 to 3,660 cm$^{-1}$, preferably from 3,580 to 3,635 cm$^{-1}$, more preferably from 3,595 to 3,620 cm$^{-1}$, more preferably from 3,600 to 3,615 cm$^{-1}$, and even more preferably from 3,606 to 3,611 cm$^{-1}$; and
  a second absorption band (B2) in the range of from 1,800 to 1,930 cm$^{-1}$, preferably from 1,830 to 1,910 cm$^{-1}$, more preferably from 1,850 to 1,890 cm$^{-1}$, more preferably from 1,860 to 1,880 cm$^{-1}$, and even more preferably from 1,865 to 1,875 cm$^{-1}$;
wherein the ratio of the maximum absorbance of the first absorption band to the second absorption band B1:B2 is comprised in the range of from 3.0 to 5.2, preferably of from 3.5 to 4.7, more preferably of from 3.8 to 4.4, more preferably of from 4.0 to 4.2, and even more preferably of from 4.03 to 4.15.

According to yet further preferred embodiments of the present invention, the IR-spectrum of the inventive materials further comprises a third absorption band (B3) comprised in the range of from 3,665 to 3,730 cm$^{-1}$, in addition to a fourth absorption band (B4) comprised in the range of from 3,450 to 3,545 cm$^{-1}$, wherein the ratio of the maximum absorbance of the third absorption band to the second absorption band B3:B2 is comprised in the range of from 1.5 to 3.5, and wherein the ratio of the maximum absorbance of the fourth absorption band to the second absorption band B4:B2 is comprised in the range of from 1.6 to 3.6. More preferably, the third absorption band (B3) is comprised in the range of from 3,670 to 3,720 cm$^{-1}$, and the fourth absorption band (B4) is comprised in the range of from 3,470 to 3,530 cm$^{-1}$, wherein the ratio of the maximum absorbance of the third absorption band to the second absorption band B3:B2 is comprised in the range of from 2.0 to 3.0, and wherein the ratio of the maximum absorbance of the fourth absorption band to the second absorption band B4:B2 is comprised in the range of from 2.0 to 3.2. More preferably, the third absorption band (B3) is comprised in the range of from 3,680 to 3,715 cm$^{-1}$, and the fourth absorption band (B4) is comprised in the range of from 3,480 to 3,520 cm$^{-1}$, wherein the ratio of the maximum absorbance of the third absorption band to the second absorption band B3:B2 is comprised in the range of from 2.3 to 2.8, and wherein the ratio of the maximum absorbance of the fourth absorption band to the second absorption band B4:B2 is comprised in the range of from 2.3 to 3.0. More preferably, the third absorption band (B3) is comprised in the range of from 3,690 to 3,710 cm$^{-1}$, and the fourth absorption band (B4) is comprised in the range of from 3,490 to 3,510 cm$^{-1}$, wherein the ratio of the maximum absorbance of the third absorption band to the second absorption band B3:B2 is comprised in the range of from 2.4 to 2.7, and wherein the ratio of the maximum absorbance of the fourth absorption band to the second absorption band B4:B2 is comprised in the range of from 2.5 to 2.8. According to particularly preferred embodiments of the present invention, in addition to first and second absorption bands (B1) and (B2) according to any of the particular and preferred embodiments of the present invention, the IR-spectrum of the inventive materials further comprises a third absorption band (B3) comprised in the range of from 3,698 to 3,702 cm$^{-1}$, in addition to a fourth absorption band (B4) comprised in the range of from 3,499 to 3,502 cm$^{-1}$, wherein the ratio of the maximum absorbance of the third absorption band to the second absorption band B3:B2 is comprised in the range of from 2.5 to 2.6, and wherein the ratio of the maximum absorbance of the fourth absorption band to the second absorption band B4:B2 is comprised in the range of from 2.6 to 2.7.

Thus, embodiments of the present invention with respect to the inventive zeolitic material having a CHA-type framework structure are yet further preferred wherein the IR-spectrum of the zeolitic material further comprises:
  a third absorption band (B3) in the range of from 3,665 to 3,730 cm$^{-1}$, preferably from 3,670 to 3,720 cm$^{-1}$, more preferably from 3,680 to 3,715 cm$^{-1}$, more preferably from 3,690 to 3,710 cm$^{-1}$, and even more preferably from 3,698 to 3,702 cm$^{-1}$; and
  a fourth absorption band (B4) in the range of from 3,450 to 3,545 cm$^{-1}$, preferably from 3,470 to 3,530 cm$^{-1}$, more preferably from 3,480 to 3,520 cm$^{-1}$, more preferably from 3,490 to 3,510 cm$^{-1}$, and even more preferably from 3,499 to 3,502 cm$^{-1}$;
wherein the ratio of the maximum absorbance of the third absorption band to the second absorption band B3:B2 is comprised in the range of from 1.5 to 3.5, preferably of from 2.0 to 3.0, more preferably of from 2.3 to 2.8, more preferably of from 2.4 to 2.7, and even more preferably of from 2.5 to 2.6; and
wherein the ratio of the maximum absorbance of the fourth absorption band to the second absorption band B4:B2 is comprised in the range of from 1.6 to 3.6, preferably of from 2.0 to 3.2, more preferably of from 2.3 to 3.0, more preferably of from 2.5 to 2.8, and even more preferably of from 2.6 to 2.7.

According to alternative embodiments of the present invention which are further preferred the IR-spectrum of the inventive zeolitic material having a CHA-type framework structure comprises a first absorption band (B'1) comprised in the range of from 3,550 to 3,660 cm$^{-1}$, a second absorption band (B'2) comprised in the range of from 3,450 to 3,545 cm$^{-1}$, and a third absorption band (B'3) comprised in the range of from 1,800 to 1,930 cm$^{-1}$, wherein the ratio of the maximum absorbance of the first absorption band to the third absorption band B'1:B'3 is comprised in the range of from 0.30 to 2.5, and wherein the ratio of the maximum absorbance of the second absorption band to the third absorption band B'2:B'3 is comprised in the range of from 0.1 to 3.0. More preferably, the first absorption band (B'1) is comprised in the range of from 3,580 to 3,635 cm$^{-1}$, the second absorption band (B'2) comprised in the range of from 3,470 to 3,530 cm$^{-1}$, and the third absorption band (B'3) comprised in the range of from 1,830 to 1,910 cm$^1$, wherein the ratio of the maximum absorbance of the first absorption band to the third absorption band B'1:B'3 is comprised in the range of from 0.50 to 2.0, and wherein the ratio of the maximum absorbance of the second absorption band to the third absorption band B'2:B'3 is comprised in the range of from 0.3 to 2.0. More preferably, the first absorption band (B'1) is comprised in the range of from 3,595 to 3,620 cm$^{-1}$, the second absorption band (B'2) comprised in the range of from 3,480 to 3,520 cm$^{-1}$, and the third absorption band (B'3) comprised in the range of from 1,850 to 1,890 cm$^{-1}$, wherein the ratio of the maximum absorbance of the first absorption band to the third absorption band B'1:B'3 is comprised in the range of from 0.50 to 2.0, and wherein the ratio of the maximum absorbance of the second absorption band to the third absorption band B'2:B'3 is comprised in the range of from 0.5 to 1.5. More preferably, the first absorption band (B'1) is comprised in the range of from 3,600 to 3,615 cm$^{-1}$, the second absorption band (B'2) comprised in the range of from 3,490 to 3,510 cm$^{-1}$, and the third absorption band (B'3) comprised in the range of from 1,860 to 1,880 cm$^{-1}$, wherein the ratio of the maximum absorbance of the first absorption band to the third absorption band B'1:B'3 is comprised in the range of from 0.80 to 1.2, preferably in the range of from 0.85 to 1.0, and wherein the ratio of the maximum absorbance of the second absorption band to the third absorption band B'2:B'3 is comprised in the range of from 0.6 to 1.0, preferably in the range of from 0.7 to 0.8. According to particularly preferred embodiments of the inventive zeolitic material having a CHA-type framework structure, the IR-spectrum comprises a first absorption band (B'1) comprised in the range of from 3,606 to 3,611 cm$^{-1}$, a second absorption band (B'2) comprised in the range of from 3,499 to 3,502 cm$^{-1}$, and a third absorption band (B'3) comprised in the range of from 1,865 to 1,875 cm$^{-1}$, wherein the ratio of the maximum absorbance of the first absorption band to the third absorption band B'1:B'3 is comprised in the range of from 0.87 to 0.91, and wherein the ratio of the maximum absorbance of the second absorption band to the third absorption band B'2:B'3 is comprised in the range of from 0.72 to 0.76.

Therefore, according to alternatively preferred embodiments of the present invention, the inventive zeolitic material having a CHA-type framework structure has an IR-spectrum which comprises:
a first absorption band (B'1) in the range of from 3,550 to 3,660 cm$^{-1}$, preferably from 3,580 to 3,635 cm$^{-1}$, more preferably from 3,595 to 3,620 cm$^{-1}$, more preferably from 3,600 to 3,615 cm$^{-1}$, and even more preferably from 3,606 to 3,611 cm$^{-1}$;
  a second absorption band (B'2) in the range of from 3,450 to 3,545 cm$^{-1}$, preferably from 3,470 to 3,530 cm$^{-1}$, more preferably from 3,480 to 3,520 cm$^{-1}$, more preferably from 3,490 to 3,510 cm$^{-1}$, and even more preferably from 3,499 to 3,502 cm$^{-1}$;
  a third absorption band (B'3) in the range of from 1,800 to 1,930 cm$^{-1}$, preferably from 1,830 to 1,910 cm$^{-1}$, more preferably from 1,850 to 1,890 cm$^{-1}$, more preferably from 1,860 cm$^{-1}$;
wherein the ratio of the maximum absorbance of the first absorption band to the third absorption band B'1:B'3 is comprised in the range of from 0.30 to 2.5, preferably of from 0.50 to 2.0, more preferably of from 0.70 to 1.5, more preferably of from 0.80 to 1.2, more preferably of from 0.85 to 1.0, and even more preferably of from 0.87 to 0.91; and wherein the ratio of the maximum absorbance of the second absorption band to the third absorption band B'2:B'3 is comprised in the range of from 0.1 to 3.0, preferably of from 0.3 to 2.0, more preferably of from 0.5 to 1.5, more preferably of from 0.6 to 1.0, more preferably of from 0.7 to 0.8, and even more preferably of from 0.72 to 0.76.

According to one or more embodiments of the present invention, it is preferred that at least a portion of the Y atoms and/or of the X atoms of the CHA-type framework structure of the zeolitic materials is isomorphously substituted by one or more elements. In this respect, there is no particular restriction as to the one or more elements which may substitute Y atoms and/or X atoms of the CHA-type framework structure wherein preferably said elements are selected from the group consisting of B, Fe, Ti, Sn, Ga, Ge, Zr, V, Nb, Cu, Zn, Li, Be, and mixtures of two or more thereof, wherein even more preferably, the one or more elements are selected from the group consisting of B, Fe, Ti, Sn, Zr, Cu, and mixtures of two or more thereof. According to particularly preferred embodiments and in particular according to particularly preferred embodiments of the alternative zeolitic material of the present invention, at least a portion of the Y atoms and/or of the X atoms in the CHA-type framework structure is isomorphously substituted by Fe and/or Cu, and preferably by Cu.

As regards the amount of the one or more elements in the zeolitic materials which substitute at least a portion of the Y atoms and/or of the X atoms in the CHA-type framework structure, no particular restriction applies according to the present invention. Thus, by way of example, the molar ratio of YO$_2$ to the one or more elements isomorphously substituted in the CHA-type framework structure may range anywhere from 5 to 100, wherein the molar ratio is preferably comprised in the range of from 10 to 80, and even more preferably of from 20 to 60. According to particularly preferred embodiments, the molar ratio of YO$_2$ to the one or more elements isomorphously substituting Y atoms and/or X atoms in the CHA-type framework structure are comprised in the range of from 25 to 50.

As regards the CHA-type framework structure of the inventive zeolitic material, besides YO$_2$ and X$_2$O$_3$ contained therein as framework elements, no particular restriction applies as to any other elements which may be contained therein as further framework elements. Thus, besides or in addition to the preferred elements suitable for isomorphous substitution according the particular and preferred embodiments of the present invention which may be contained in the CHA-type framework structure of the zeolitic material, any further one or more elements than the aforementioned may also be contained therein as framework elements in addition to the one or more tetravalent elements Y and the one or more trivalent elements X. According to particular embodiments of the present invention, however, it is preferred that the zeolitic material having a CHA-type framework does not contain any substantial amount of P and/or As therein as framework element. In one or more embodiment, the term "substantial" with respect to the amount of an element contained in the framework structure of the inventive zeolitic material preferably indicates an amount of 5 wt.-% or less of a framework element based on 100 wt-% of YO$_2$ contained in the framework structure, preferably an amount of 1 wt.-% or less, more preferably of 0.5 wt.-% or less, more preferably of 0.1 wt.-% or less, more preferably of 0.05 wt.-% or less, more preferably of 0.01 wt.-% or less, more preferably of 0.005 wt.-% or less, more preferably of 0.001 wt.-% or less, more preferably of 0.0005 wt.-% or less, and even more preferably of 0.0001 wt.-% or less of a framework element based on 100 wt.-% of YO$_2$.

According to said particularly preferred embodiments wherein zeolitic material having a CHA-type framework does not contain any substantial amount of P and/or As, it is yet further preferred according to one or more embodiments of the present invention that the CHA-type framework does not contain any substantial amount of one or more elements selected from the group consisting of P, As, V, and combinations of two or more thereof, and more preferably no substantial amount of any one or more elements selected from the group consisting of P, As, Sb, Bi, V, Nb, Ta, and combinations of two or more thereof. According to yet further particularly preferred embodiments of the present invention, the inventive zeolitic material having a CHA-type framework structure does not contain any substantial amount of any pentavalent elements Z as framework element.

It is further preferred according to one or more embodiments of the present invention that the zeolitic material does not comprise any substantial amount of SSZ-13 and/or SSZ-15, wherein within the meaning of one or more embodiments of the present invention "substantial" with respect to the amount of SSZ-13 and/or SSZ-15 refers to an amount of 5 wt.-% or less thereof based on 100 wt-% of the zeolitic material having a CHA-type framework structure according to any of the particular and preferred embodiments of the present invention, and preferably to an amount of 1 wt.-% or less, more preferably of 0.5 wt.-% or less, more preferably of 0.1 wt.-% or less, more preferably of 0.05 wt.-% or less, more preferably of 0.01 wt.-% or less, more preferably of 0.005 wt.-% or less, more preferably of 0.001 wt.-% or less, more preferably of 0.0005 wt.-% or less, and even more preferably of 0.0001 wt.-% or less of SSZ-13 and/or SSZ-15.

Concerning $YO_2:X_2O_3$ molar ratio displayed by the zeolitic materials of one or more embodiments of the present invention, any conceivable molar ratio may be adopted. Thus, by way of example, the $YO_2:X_2O_3$ molar ratio of the inventive materials may be comprised anywhere in the range of from 2 to 200, wherein preferably the $YO_2:X_2O_3$ molar ratio is comprised in the rage of from 5 to 100, more preferably of from 10 to 60, more preferably of from 15 to 50, and even more preferably of from 20 to 40. According to particularly preferred embodiments of the present invention, the $YO_2:X_2O_3$ molar ratio of the zeolitic materials is comprised in the range of from 22 to 31.

According to one or more embodiments of the present invention, the zeolitic materials having an CHA-type framework structure comprise $YO_2$. In principle, Y stands for any conceivable tetravalent element, Y standing for either or several tetravalent elements. Preferred tetravalent elements according to one or more embodiments of the present invention include Si, Sn, Ti, Zr, and Ge, and combinations thereof. More preferably, Y stands for Si, Ti, or Zr, or any combination of said tetravalent elements, even more preferably for Si, and/or Sn. According to one or more embodiments of the present invention, it is particularly preferred that Y stands for Si.

As regards $X_2O_3$ optionally comprised in the CHA-framework structure of the zeolitic materials, X may in principle stand for any conceivable trivalent element, wherein X stands for one or several trivalent elements. Preferred trivalent elements according to one or more embodiments of the present invention include Al, B, In, and Ga, and combinations thereof. More preferably, X stands for Al, B, or In, or any combination of said trivalent elements, even more preferably for Al and/or B. According to one or more embodiments of the present invention, it is particularly preferred that X stands for Al.

In addition to the framework elements of the zeolitic materials of one or more embodiments of the present invention having an CHA-type framework structure, said zeolitic materials preferably further contains one or more types of non-framework elements which do not constitute the framework structure and are accordingly present in the pores and/or cavities formed by the framework structure and typical for zeolitic materials in general. In this respect, there is no particular restriction as to the types of non-framework elements which may be contained in the zeolitic materials, nor with respect to the amount in which they may be present therein. It is, however, preferred that the zeolitic materials comprise one or more cation and/or cationic elements as ionic non-framework elements, wherein again no particular restriction applies as to the type or number of different types of ionic non-framework elements which may be present in the zeolitic materials, nor as to their respective amount. According to preferred embodiments of the present invention, the ionic non-framework elements preferably comprise one or more cations and/or cationic elements selected from the group consisting of $H^+$, $NH_4^+$, Mg, Sr, Zr, Cr, Mo, Fe, Co, Ni, Cu, Zn, Ru, Rh, Pd, Ag, Os, Ir, Pt, Au, and mixtures of two or more thereof, wherein more preferably these are selected from the group consisting of $H^+$, $NH_4^+$, Mg, Sr, Cr, Mo, Fe, Co, Ni, Cu, Zn, Ag, and mixtures of two or more thereof, more preferably from the group consisting of $H^+$, $NH_4^+$, Mg, Cr, Mo, Fe, Ni, Cu, Zn, Ag, and mixtures of two or more thereof. According to particularly preferred embodiments of the present invention, the ionic non-framework elements comprise one or more cations and/or cationic elements selected from the group consisting of Mg, Mo, Fe, Ni, Cu, Zn, Ag, and mixtures of two or more thereof.

There is no particular restriction according to the present invention as to the suitable physical and/or chemical characteristics of the inventive zeolitic materials. Thus, as regards for example the porosity and/or surface area of the inventive materials, these may adopt any suitable values. Thus, as regards the BET surface area of the zeolitic materials as determined according to DIN 66135, it may accordingly range anywhere from 100 to 850 $m^2/g$, wherein preferably the surface area of the inventive zeolitic materials is comprised in the range of from 200 to 800 $m^2/g$, more preferably from 300 to 750 $m^2/g$, more preferably from 400 to 720 $m^2/g$, more preferably from 500 to 700 $m^2/g$, and even more preferably from 550 to 680 $m^2/g$. According to particularly preferred embodiments of the present invention, the BET surface area of the zeolitic materials as determined according to DIN 66135 ranges from 600 to 660 $m^2/g$.

In general, there is no particular restriction according to the present invention as to the specific type or types of zeolitic materials having a CHA-type framework which may be contained in the inventive zeolitic material. It is, however, preferred that the inventive zeolitic material comprises one or more zeolites selected from the group consisting of (Ni(deta)$_2$)-UT-6, Chabazite, |Li—Na| [Al—Si—O]-CHA, DAF-5, Dehyd. Na-Chabazite, K-Chabazite, LZ-218, Linde D, Linde R, Phi, SSZ-62, UiO-21, Willhendersonite, ZK-14, ZYT-6, and combinations of two or more thereof.

More preferably the inventive zeolitic material having a CHA-type framework structure comprises one or more zeolites selected from the group consisting of (Ni(deta)$_2$)-UT-6, Chabazite, |Li—Na| [Al—Si—O]-CHA, DAF-5, Dehyd. Na-Chabazite, K-Chabazite (Iran), LZ-218, Linde D, Linde R, Phi, SSZ-62, UiO-21, Willhendersonite, ZK-14, ZYT-6, and combinations of two or more thereof. According to particularly preferred embodiments of the present invention, the inventive zeolitic material comprises Chabazite, wherein even more preferably the inventive zeolitic material according to particular and preferred embodiments of the present invention is Chabazite.

Depending on the specific needs of its application, the zeolitic material of one or more embodiments of the present invention can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of one or more embodiments of the present invention is employed as catalyst or adsorbent.

Accordingly, one or more embodiments of the present invention also relates to a molding comprising the inventive zeolitic material.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to one or more embodiments of the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

The zeolitic material of one or more embodiments of the present invention may therefore also be provided in the form of extrudates, pellets, tablets or particles of any other suitable shape, for use as a packed bed of particulate catalyst, or as shaped pieces such as plates, saddles, tubes, or the like.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promoters, or the like. Typically, the carrier comprises a member, often referred to as a "honeycomb" carrier, comprising one or more refractory bodies having a plurality of fine, parallel gas flow passages extending there through. Such carriers are well known in the art and may be made of any suitable material such as cordierite or the like.

In general, the zeolitic material described above can be used as molecular sieve, adsorbent, catalyst, catalyst support or binder thereof. For example, the zeolitic material can be used as molecular sieve to dry gases or liquids, for selective molecular separation, e.g. for the separation of hydrocarbons or amines; as ion exchanger; as chemical carrier; as adsorbent, in particular as adsorbent for the separation of hydrocarbons or amines; or as a catalyst. Most preferably, the zeolitic material according to one or more embodiments of the present invention is used as a catalyst and/or as a catalyst support.

Thus, one aspect of the invention pertains to a method of catalyzing a chemical reaction, the method comprising contacting one or more reactants in a chemical reaction with a synthetic zeolitic material having a CHA-type framework structure according to any of the embodiments described herein. In such embodiments, the zeolitic material may act as a catalyst and/or catalyst support. Another aspect of the invention pertains to a method of separating one or more compounds, the method comprising contacting one or more compounds with a synthetic zeolitic material having a CHA-type framework structure according to any of the embodiments described herein. In such embodiments, the zeolitic material may act as a molecular sieve, adsorbent or ion exchanger.

According to a preferred embodiment of the present invention, the zeolitic material of the invention is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond. In particularly preferred embodiments of the present invention, the zeolitic material is used as a catalyst and/or catalyst support in a fluid catalytic cracking (FCC) process.

Furthermore, it is preferred according to one or more embodiments of the present invention, that the zeolitic material is used as a catalyst for producing light olefins from non-petroleum feedstock by conversion of oxygenates, such as lower alcohols (methanol, ethanol), ethers (dimethyl ether, methyl ethyl ether), esters (dimethyl carbonate, methyl formate) and the like to olefins, and especially in the conversion of lower alcohols to light olefins. According to particularly preferred embodiments, the zeolitic material of the present invention is used in the conversion of methanol to olefin (MTO)

According to a further embodiment of the present invention, the zeolitic material of the invention is preferably used in a catalytic process involving the conversion of at least one compound comprising at least one nitrogen-oxygen bond. Particularly preferred according to one or more embodiments of the present invention is the use of the zeolitic material as a catalyst and/or catalyst support in a selective catalytic reduction (SCR) process for the selective reduction of nitrogen oxides $NO_x$; for the oxidation of $NH_3$, in particular for the oxidation of $NH_3$ slip in diesel systems; for the decomposition of $N_2O$. According to particularly preferred embodiments of the present invention, the zeolitic material used in a catalytic process involving the conversion of at least one compound comprising at least one nitrogen-oxygen bond comprises Cu and/or Fe, and more preferably Cu.

Therefore, one or more aspects of the present invention also relates to a method for selectively reducing nitrogen oxides $NO_x$ by contacting a stream containing $NO_x$ with a catalyst containing the zeolitic material according to the present invention under suitable reducing conditions; to a method of oxidizing $NH_3$, in particular of oxidizing $NH_3$ slip in diesel systems, by contacting a stream containing $NH_3$ with a catalyst containing the zeolitic material according to one or more embodiments of the present invention under suitable oxidizing conditions; to a method of decomposing of $N_2O$ by contacting a stream containing $N_2O$ with a catalyst containing the zeolitic material according to one or more embodiments of the present invention under suitable decomposition conditions; to a method of controlling emissions in Advanced Emission Systems such as Homogeneous Charge Compression Ignition (HCCI) engines by contacting an emission stream with a catalyst containing the zeolitic material according to one or more embodiments of the present invention under suitable conditions; to a fluid catalytic cracking FCC process wherein the zeolitic material according to one or more embodiments of the present invention is employed as additive; to a method of converting an organic compound by contacting said compound with a catalyst containing the zeolitic material according to one or more embodiments of the present invention under suitable conversion conditions; to a "stationary source" process wherein a catalyst is employed containing the zeolitic material according to one or more embodiments of the present invention.

Therefore, one or more aspects of the present invention also relates to a method for selectively reducing nitrogen oxides $NO_x$, wherein a gaseous stream containing nitrogen oxides $NO_x$, preferably also containing ammonia and/or urea, is contacted with the zeolitic material according to one or more embodiments of the present invention or the zeolitic material obtainable or obtained according to one or more embodiments of the present invention, preferably in the form of a molded catalyst, still more preferably as a molded catalyst wherein the zeolitic material is deposited on a suitable refractory carrier, still more preferably on a "honeycomb" carrier.

The nitrogen oxides which are reduced using a catalyst containing the zeolitic material according to one or more embodiments of the present invention or the zeolitic material obtainable or obtained according to one or more embodiments of the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogenous materials may be mentioned.

Most preferably, the zeolitic material according to one or more embodiments of the present invention or the zeolitic material obtainable or obtained according to one or more embodiments of the present invention is used as a molded catalyst, still more preferably as a molded catalyst wherein the zeolitic material is deposited on a suitable refractory carrier, still more preferably on a "honeycomb" carrier, for the selective reduction of nitrogen oxides $NO_x$, i.e. for selective catalytic reduction of nitrogen oxides. In particular, the selective reduction of nitrogen oxides wherein the zeolitic material according to one or more embodiments of the present invention is employed as catalytically active material is carried out in the presence ammonia and/or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to one or more embodiments of the present invention; a urea storage tank; a urea pump; a urea dosing system; a urea injector/nozzle; and a respective control unit.

Furthermore, it is preferred according to one or more embodiments of the present invention that the zeolitic material is used as a molecular trap for organic compounds. In general, any type of organic compound may be trapped in the zeolitic material, wherein it is preferred that the compound is reversibly trapped, such that it may be later released from the zeolitic material, preferably wherein the organic compound is released—preferably without conversion thereof—by an increase in temperature and/or a decrease in pressure. Furthermore, it is preferred that the zeolitic material is used to trap organic compounds of which the dimensions allow them to penetrate the microporous system of the molecular structure. According to yet further embodiments of the present invention, it is preferred that the trapped compounds are released under at least partial conversion thereof to a chemical derivative and/or to a decomposition product thereof, preferably to a thermal decomposition product thereof.

When preparing specific catalytic compositions or compositions for different purposes, it is also conceivable to blend the zeolitic material according to one or more embodiments of the present invention with at least one other catalytically active material or a material being active with respect to the intended purpose. It is also possible to blend at least two different inventive materials which may differ in their $YO_2:X_2O_3$ molar ratio, and in particular in their $SiO_2:Al_2O_3$ molar ratio, and/or in the presence or absence of one or more further metals such as one or more transition metals and/or in the specific amounts of a further metal such as a transition metal, wherein according to particularly preferred embodiments, the one or more transition metal comprises Cu and/or Fe, more preferably Cu. It is also possible to blend at least two different inventive materials with at least one other catalytically active material or a material being active with respect to the intended purpose.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending there through from an inlet or an outlet face of the substrate, such that passages are open to fluid flow there through (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention may be deposited on an open cell foam substrate. Such substrates are well known in the art, and are typically formed of refractory ceramic or metallic materials.

Especially preferred is the use of a catalyst containing the zeolitic material according to one or more embodiments of the present invention or the zeolitic material obtainable or obtained according to one or more embodiments of the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, one or more aspects of the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to one or more embodiments of the present invention or the zeolitic material obtainable or obtained according to one or more embodiments of the present invention is employed as catalytically active material.

One or more aspects of the present invention therefore relates to the use of the zeolitic material of the invention, in particular in the field of catalysis and/or in the treatment of exhaust gas, wherein said exhaust gas treatment comprises industrial and automotive exhaust gas treatment. In these and other applications, the zeolitic material of one or more embodiments of the present invention can by way of example be used as a molecular sieve, catalyst, and/or catalyst support.

In embodiments of the present invention involving the use of the zeolitic material of the invention in exhaust gas treatment, the zeolitic material is preferably used in the treatment of industrial or automotive exhaust gas, more preferably as a molecular sieve in said applications. In a particularly preferred embodiment, the zeolitic material used in exhaust gas treatment is comprised in a hydrocarbon trap.

Therefore, another aspect of the present invention further relates to the use of a zeolitic material according to one or more embodiments of the present invention, and in particular according to preferred and particularly preferred embodiments thereof as defined in the present application, as a molecular sieve, as an adsorbent, for ion-exchange, as a catalyst and/or as a catalyst support, preferably as a catalyst for the selective catalytic reduction (SCR) of nitrogen oxides $NO_x$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis. According to one or more embodiments of the present invention it is however particular preferred that the organotemplate-free zeolitic material having a CHA-type framework structure is used as a catalyst for the selective catalytic reduction (SCR) of nitrogen oxides $NO_x$.

Aspects of the present invention includes the following embodiments, wherein these include the specific combinations of embodiments as indicated by the respective inter-dependencies defined therein:

1. A process for the preparation of a zeolitic material having a CHA-type framework structure comprising $YO_2$ and $X_2O_3$, wherein said process comprises the steps of:
   (1) providing a mixture comprising one or more sources for $YO_2$, one or more sources for $X_2O_3$, and one or more tetraalkylammonium cation $R^1R^2R^3R^4N^+$-containing compounds as structure directing agent;
   (2) crystallizing the mixture obtained in step (1) for obtaining a zeolitic material
   having a CHA-type framework structure;
   wherein Y is a tetravalent element and X is a trivalent element,
   wherein $R^1$, $R^2$, and $R^3$ independently from one another stand for alkyl,
   wherein $R^4$ stands for cycloalkyl, and
   wherein the mixture provided in step (1) does not contain any substantial amount of a source for $Z_2O_5$, wherein Z is P, preferably P and As, wherein more preferably Z is any pentavalent element which is a source for $Z_2O_5$ in the CHA-type framework structure crystallized in step (2).

2. The process of embodiment 1, wherein $R^1$, $R^2$, and $R^3$ independently from one another stand for optionally substituted and/or optionally branched $(C_1-C_6)$alkyl, preferably $(C_1-C_5)$alkyl, more preferably $(C_1-C_4)$alkyl, more preferably $(C_1-C_3)$alkyl, and even more preferably for optionally substituted methyl or ethyl, wherein even more preferably $R^1$, $R^2$, and $R^3$ stand for optionally substituted methyl, preferably unsubstituted methyl.

3. The process of embodiment 1 or 2, wherein $R^4$ stands for optionally heterocyclic and/or optionally substituted 5- to 8-membered cycloalkyl, preferably for 5- to 7-membered cycloalkyl, more preferably for 5- or 6-membered cycloalkyl, wherein even more preferably $R^4$ stands for optionally heterocyclic and/or optionally substituted 6-membered cycloalkyl, preferably optionally substituted cyclohexyl, and more preferably non-substituted cyclohexyl.

4. The process of any of embodiments 1 to 3, wherein the one or more tetraalkylammonium cation $R^1R^2R^3R^4N^+$-containing compounds comprise one or more N,N,N-tri($C_1$-$C_4$)alkyl-($C_5$-$C_7$)cycloalkylammonium compounds, preferably one or more N,N,N-tri($C_1$-$C_3$)alkyl-($C_5$-$C_6$)cycloalkylammonium compounds, more preferably one or more N,N,N-tri($C_1$-$C_2$)alkyl-($C_5$-$C_6$)cycloalkylammonium compounds, more preferably one or more N,N,N-tri($C_1$-$C_2$)alkyl-cyclopentylammonium and/or one or more N,N,N-tri($C_1$-$C_2$)alkyl-cyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein even more preferably the one or more tetraalkylammonium cation $R^1R^2R^3R^4N^+$-containing compounds comprise one or more N,N,N-trimethyl-cyclohexylammonium compounds.

5. The process of any of embodiments 1 to 4, wherein the one or more tetraalkylammonium cation $R^1R^2R^3R^4N^+$-containing compounds are salts, preferably one or more salts selected from the group consisting of halides, preferably chloride and/or bromide, more preferably chloride, hydroxide, sulfate, nitrate, phosphate, acetate, and mixtures of two or more thereof, more preferably from the group consisting of chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or chlorides, and even more preferably tetraalkylammonium hydroxides.

6. The process of any of embodiments 1 to 5, wherein Y is selected from the group consisting of Si, Sn, Ti, Zr, Ge, and mixtures of two or more thereof, Y preferably being Si.

7. The process of any of embodiments 1 to 6, wherein the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, silicic acid esters, and mixtures of two or more thereof, preferably from the group consisting of fumed silica, silica hydrosols, reactive amorphous solid silicas, silica gel, silicic acid, colloidal silica, silicic acid esters, and mixtures of two or more thereof, more preferably from the group consisting of fumed silica, silica hydrosols, reactive amorphous solid silicas, silica gel, colloidal silica, and mixtures of two or more thereof, wherein even more preferably the one or more sources for $YO_2$ comprises fumed silica and/or colloidal silica.

8. The process of any of embodiments 1 to 7, wherein X is selected from the group consisting of Al, B, In, Ga, and mixtures of two or more thereof, X preferably being Al and/or B, and more preferably being Al.

9. The process of any of embodiments 1 to 8, wherein the one or more sources for $X_2O_3$ comprises one or more compounds selected from the group consisting of alumina, aluminates, aluminum salts, and mixtures of two or more thereof, preferably from the group consisting of alumina, aluminum salts, and mixtures of two or more thereof, more preferably from the group consisting of alumina, AlO(OH), Al(OH)$_3$, aluminum halides, preferably aluminum fluoride and/or chloride and/or bromide, more preferably aluminum fluoride and/or chloride, and even more preferably aluminum chloride, aluminum sulfate, aluminum phosphate, aluminum fluorosilicate, and mixtures of two or more thereof, more preferably from the group consisting of AlO(OH), Al(OH)$_3$, aluminum chloride, aluminum sulfate, aluminum phosphate, and mixtures of two or more thereof, more preferably from the group consisting of AlO(OH), Al(OH)$_3$, aluminum chloride, aluminum sulfate, and mixtures of two or more thereof, wherein even more preferably the one or more sources for $X_2O_3$ comprises AlO(OH) and/or aluminum sulfate, preferably aluminum sulfate.

10. The process of any of embodiments 1 to 9, wherein the $YO_2$:$X_2O_3$ molar ratio of the mixture according to step (1) ranges from 0.5 to 500, preferably from 1 to 200, more preferably from 5 to 150, more preferably from 20 to 100, more preferably from 30 to 80, more preferably from 40 to 60, and even more preferably from 45 to 55.

11. The process of any of embodiments 1 to 10, wherein the mixture according to step (1) further comprises one or more solvents, wherein said one or more solvents preferably comprises water, more preferably distilled water.

12. The process of any of embodiments 1 to 11, wherein the $H_2O$:$YO_2$ molar ratio of the mixture according to step (1) ranges from 3 to 50, more preferably from 4 to 30, more preferably from 4.5 to 20, more preferably from 5 to 15, more preferably from 5.5 to 12, and even more preferably from 6 to 10.

13. The process of any of embodiments 1 to 12, wherein the molar ratio of the one or more tetraalkylammonium cations $R^1R^2R^3R^4N^+$:$YO_2$ in the mixture provide according to step (1) ranges from 0.05 to 3, preferably from 0.1 to 1.5, more preferably from 0.3 to 1, more preferably from 0.4 to 0.8, more preferably from 0.45 to 0.75, and even more preferably from 0.5 to 0.7.

14. The process of any of embodiments 1 to 13, wherein the mixture provided in step (1) contains 3 wt.-% or less of one or more metals M based on 100 wt.-% of $YO_2$, preferably 1 wt.-% or less, more preferably 0.5 wt.-% or less, more preferably 0.1 wt.-% or less, more preferably 0.05 wt.-% or less, more preferably 0.01 wt.-% or less, more preferably 0.005 wt.-% or less, more preferably 0.001 wt.-% or less, more preferably 0.0005 wt.-% or less, more preferably 0.0001 wt.-% or less of one or more metals M based on 100 wt.-% of $YO_2$, wherein even more preferably the mixture provided in step (1) contains no metal M, wherein M stands for sodium or potassium, preferably for sodium and potassium, more preferably for the group of alkali metals, wherein even more preferably M stands for the group of alkali and alkaline earth metals.

15. The process of any of embodiments 1 to 14, wherein the mixture according to step (1) further comprises one or more sources of one or more elements suitable for isomorphous substitution of at least a portion of the Y atoms and/or of the X atoms in the CHA-type framework structure, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Fe and/or Cu, preferably Cu.

16. The process of any of embodiments 1 to 15, wherein the molar ratio of $YO_2$ to the one or more elements suitable for isomorphous substitution ranges from 5 to 200, preferably from 10 to 100, more preferably from 20 to 70, and even more preferably from 25 to 50.

17. The process of any of embodiments 1 to 16, wherein the crystallization in step (2) involves heating of the mixture, preferably at a temperature ranging from 90 to 210° C., preferably from 110 to 200° C., more preferably from 120 to 190° C., more preferably from 135 to 180° C., and even more preferably from 150 to 170° C.

18. The process of any of embodiments 1 to 17, wherein the crystallization in step (2) is conducted under solvothermal conditions, preferably under hydrothermal conditions.

19. The process of any of embodiments 1 to 18, wherein the crystallization in step (2) involves heating of the mixture for a period ranging from 0.5 to 50 d, preferably from 1 to 30 d, more preferably from 1.5 to 13 d, more preferably from 2 to 10 d, more preferably from 2 to 7 d, more preferably from 2.5 to 5 d, more preferably from 2.5 to 4.5 d, and even more preferably from 2.5 to 3.5 d.

20. The process of any of embodiments 1 to 19, wherein the crystallization in step (2) involves agitating the mixture, preferably by stirring.

21. The process of any of embodiments 1 to 20 further comprising one or more of the following steps of
(3) isolating the zeolitic material, preferably by filtration, and/or
(4) washing the zeolitic material, and/or
(5) drying the zeolitic material, and/or
(6) subjecting the zeolitic material to an ion-exchange procedure,
wherein the steps (3) and/or (4) and/or (5) and/or (6) can be conducted in any order, and
wherein one or more of said steps is preferably repeated one or more times.

22. The process of embodiment 21, wherein in the at least one step (6) one or more ionic non-framework elements contained in the zeolite framework is ion-exchanged, preferably against one or more cations and/or cationic elements, wherein the one or more cation and/or cationic elements are preferably selected from the group consisting of $H^+$, $NH_4^+$, Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Mo, Fe, Co, Ni, Cu, Zn, Ag, and mixtures of two or more thereof, more preferably from the group consisting of $H^+$, $NH_4^+$, Cr, Mg, Mo, Fe, Ni, Cu, Zn, Ag, and mixtures of two or more thereof, and even more preferably from the group consisting of Mg, Mo, Fe, Ni, Cu, Zn, Ag, and mixtures of two or more thereof, wherein the one or more ionic non-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, even more preferably Na.

23. The process of any of embodiments 1 to 22, wherein the mixture provided in step (1) further comprises seed crystals, preferably seed crystals comprising a zeolitic material having the CHA-type framework structure, wherein the zeolitic material of the seed crystals is preferably obtainable and/or obtained according to any one of embodiments 1 to 22.

24. The process of embodiment 23, wherein the amount of seed crystals in the mixture according to step (1) ranges from 0.1 to 20 wt.-% based on 100 wt.-% of $YO_2$ in the at least one source for $YO_2$, preferably from 0.3 to 10 wt.-%, more preferably from 0.5 to 5 wt.-%, more preferably from 1 to 3 wt.-%, and even more preferably from 1.5 to 2.5 wt.-% based on 100 wt.-% of $YO_2$.

25. The process of any of embodiments 1 to 24, wherein the mixture provided in step (1) does not contain any substantial amount of a trimethyl benzyl ammonium containing compound, preferably of a trialkyl benzyl ammonium compound wherein preferably the mixture provided in step (1) does not contain any substantial amount of an organotemplate other than the one or more tetraalkylammonium cation $R^1R^2R^3R^4N^+$-containing compounds as structure directing agent, wherein more preferably the mixture provided in step (1) does not contain any substantial amount of a structure directing agent other than the one or more tetraalkylammonium cation $R^1R^2R^3R^4N^+$-containing compounds, and wherein even more preferably, the mixture provided in step (1) only contains one or more N,N,N-trimethyl-cyclohexylammonium compounds and preferably N,N,N-trimethyl-cyclohexylammonium hydroxide as structure directing agent for the crystallization of a zeolitic material having a CHA-type framework structure in step (2).

26. A synthetic zeolitic material having a CHA-type framework structure obtainable and/or obtained according to any of embodiments 1 to 25, wherein the CHA-type framework structure comprises $YO_2$ and $X_2O_3$, wherein the CHA-type framework does not contain any substantial amount of P and/or As, preferably one or more elements selected from the group consisting of P, As, V, and combinations of two or more thereof, more preferably one or more elements selected from the group consisting of P, As, Sb, Bi, V, Nb, Ta, and combinations of two or more thereof, wherein even more preferably said framework structure does not contain any substantial amount of any pentavalent elements Z as framework element.

27. A synthetic zeolitic material having a CHA-type framework structure comprising $YO_2$ and $X_2O_3$,
wherein Y is a tetravalent element and X is a trivalent element,
said material having an X-ray diffraction pattern comprising at least the following reflections:

| Diffraction angle 2θ/° [Cu K(alpha 1)] | Intensity (%) |
| --- | --- |
| 9.44-9.88 | 29-92 |
| 16.03-16.55 | 32-79 |
| 17.81-18.13 | 12-42 |
| 20.62-21.30 | 100 |
| 25.02-25.42 | 25-70 |
| 30.83-31.43 | 39-73 | wherein 100% relates to the intensity of the maximum peak in the X-ray powder diffraction pattern.

28. The zeolitic material of embodiment 26 or 27, wherein the $^{27}Al$ MAS NMR of the zeolitic material, and preferably of the untreated zeolitic material as-synthesized, comprises:
a first peak (P1) in the range of from 52.3 to 58.6 ppm, preferably of from 52.9 to 57.8 ppm, more preferably of from 53.5 to 57.0 ppm, and even more preferably of from 54.1 to 56.2 ppm; and a second peak (P2) in the range of from −2.3 to −4.1 ppm, preferably of from −2.5 to −3.8 ppm, more preferably of from −2.7 to −3.6 ppm, and even more preferably of from −2.8 to −3.4 ppm;
wherein the integration of the first and second peaks in the $^{27}$Al MAS NMR of the zeolitic material preferably offers a ratio of the integration values P1:P2 comprised in the range of from 1:(0-0.22), more preferably of from 1:(0.001-0.2), more preferably of from 1:(0.005-0.18), more preferably of from 1:(0.01-0.15), more preferably of from 1:(0.02-0.13), and even more preferably of from 1:(0.03-0.12).

29. The zeolitic material of any of embodiments 26 to 28, wherein the IR-spectrum of the zeolitic material comprises:
a first absorption band (B1) in the range of from 3,550 to 3,660 cm$^{-1}$, preferably from 3,580 to 3,635 cm$^{-1}$, more preferably from 3,595 to 3,620 cm$^{-1}$, more preferably from 3,600 to 3,615 cm$^{-1}$, and even more preferably from 3,606 to 3,611 cm$^{-1}$; and
a second absorption band (B2) in the range of from 1,800 to 1,930 cm$^{-1}$, preferably from 1,830 to 1,910 cm$^{-1}$, more preferably from 1,850 to 1,890 cm$^{-1}$, more preferably from 1,860 to 1,880 cm$^{-1}$, and even more preferably from 1,865 to 1,875 cm$^{-1}$;
wherein the ratio of the maximum absorbance of the first absorption band to the second absorption band B1:B2 is comprised in the range of from 3.0 to 5.2, preferably of from 3.5 to 4.7, more preferably of from 3.8 to 4.4, more preferably of from 4.0 to 4.2, and even more preferably of from 4.03 to 4.15.

30. The zeolitic material of embodiment 29, wherein the IR-spectrum of the zeolitic material further comprises:
a third absorption band (B3) in the range of from 3,665 to 3,730 cm$^{-1}$, preferably from 3,670 to 3,720 cm$^{-1}$, more preferably from 3,680 to 3,715 cm$^{-1}$, more preferably from 3,690 to 3,710 cm$^{-1}$, and even more preferably from 3,698 to 3,702 cm$^{-1}$; and
a fourth absorption band (B4) in the range of from 3,450 to 3,545 cm$^{-1}$, preferably from 3,470 to 3,530 cm$^{-1}$, more preferably from 3,480 to 3,520 cm$^{-1}$, more preferably from 3,490 to 3,510 cm$^{-1}$, and even more preferably from 3,499 to 3,502 cm$^{-1}$;
wherein the ratio of the maximum absorbance of the third absorption band to the second absorption band B3:B2 is comprised in the range of from 1.5 to 3.5, preferably of from 2.0 to 3.0, more preferably of from 2.3 to 2.8, more preferably of from 2.4 to 2.7, and even more preferably of from 2.5 to 2.6; and
wherein the ratio of the maximum absorbance of the fourth absorption band to the second absorption band B4:B2 is comprised in the range of from 1.6 to 3.6, preferably of from 2.0 to 3.2, more preferably of from 2.3 to 3.0, more preferably of from 2.5 to 2.8, and even more preferably of from 2.6 to 2.7.

31. The zeolitic material of any of embodiments 26 to 28, wherein the IR-spectrum of the zeolitic material further comprises:
a first absorption band (B'1) in the range of from 3,550 to 3,660 cm$^{-1}$, preferably from 3,580 to 3,635 cm$^{-1}$, more preferably from 3,595 to 3,620 cm$^{-1}$, more preferably from 3,600 to 3,615 cm$^{-1}$, and even more preferably from 3,606 to 3,611 cm$^{-1}$;
a second absorption band (B'2) in the range of from 3,450 to 3,545 cm$^{-1}$, preferably from 3,470 to 3,530 cm$^{-1}$, more preferably from 3,480 to 3,520 cm$^{-1}$, more preferably from 3,490 to 3,510 cm$^{-1}$, and even more preferably from 3,499 to 3,502 cm$^{-1}$;
a third absorption band (B'3) in the range of from 1,800 to 1,930 cm$^{-1}$, preferably from 1,830 to 1,910 cm$^{-1}$, more preferably from 1,850 to 1,890 cm$^{-1}$, more preferably from 1,860 to 1,880 cm$^{-1}$, and even more preferably from 1,865 to 1,875 cm$^{-1}$;
wherein the ratio of the maximum absorbance of the first absorption band to the third absorption band B'1:B'3 is comprised in the range of from 0.30 to 2.5, preferably of from 0.50 to 2.0, more preferably of from 0.70 to 1.5, more preferably of from 0.80 to 1.2, more preferably of from 0.85 to 1.0, and even more preferably of from 0.87 to 0.91; and wherein the ratio of the maximum absorbance of the second absorption band to the third absorption band B'2:B'3 is comprised in the range of from 0.1 to 3.0, preferably of from 0.3 to 2.0, more preferably of from 0.5 to 1.5, more preferably of from 0.6 to 1.0, more preferably of from 0.7 to 0.8, and even more preferably of from 0.72 to 0.76.

32. The zeolitic material of any of embodiments 26 to 31, wherein the CHA-type framework does not contain any substantial amount of P and/or As, preferably one or more elements selected from the group consisting of P, As, V, and combinations of two or more thereof, more preferably one or more elements selected from the group consisting of P, As, Sb, Bi, V, Nb, Ta, and combinations of two or more thereof, wherein even more preferably the framework structure does not contain any substantial amount of any pentavalent elements Z as framework element, and wherein the zeolitic material preferably does not comprise SSZ-13 and/or SSZ-15.

33. The zeolitic material of any of embodiments 26 to 32, wherein the YO$_2$:X$_2$O$_3$ molar ratio ranges from 2 to 200, preferably from 5 to 100, more preferably from 10 to 60, more preferably from 15 to 50, more preferably from 20 to 40, and even more preferably from 22 to 31.

34. The zeolitic material of any of embodiments 26 to 33, wherein Y is selected from the group consisting of Si, Sn, Ti, Zr, Ge, and mixtures of two or more thereof, Y preferably being Si.

35. The zeolitic material of any of embodiments 26 to 34, wherein X is selected from the group consisting of Al, B, In, Ga, and mixtures of two or more thereof, X preferably being Al and/or B, and more preferably being Al.

36. The zeolitic material of any of embodiments 26 to 35, wherein the zeolitic material preferably comprises one or more zeolites selected from the group consisting of (Ni (deta)$_2$)-UT-6, Chabazite, |Li—Na| [Al—Si—O]-CHA, DAF-5, Dehyd. Na-Chabazite, K-Chabazite, LZ-218, Linde D, Linde R, Phi, SSZ-62, UiO-21, Willhendersonite, ZK-14, ZYT-6, and combinations of two or more thereof, preferably from the group consisting of (Ni (deta)$_2$)-UT-6, Chabazite, |Li—Na| [Al—Si—O]-CHA, DAF-5, Dehyd. Na-Chabazite, K-Chabazite (Iran), LZ-218, Linde D, Linde R, Phi, SSZ-62, UiO-21, Willhendersonite, ZK-14, ZYT-6, and combinations of two or more thereof, and wherein even more preferably the zeolitic material comprises Chabazite.

37. The zeolitic material of any of embodiments 26 to 36, wherein the BET surface area of the zeolitic material determined according to DIN 66135 ranges from 100 to 850 m$^2$/g, preferably from 200 to 800 m$^2$/g, more preferably from 300 to 750 m$^2$/g, more preferably from 400 to 720 m$^2$/g, more preferably from 500 to 700 m$^2$/g, more preferably from 550 to 680 m$^2$/g, more preferably from 600 to 660 m$^2$/g.

38. Use of a synthetic zeolitic material having a CHA-type framework structure according to embodiment 26 to 37 as a molecular sieve, as an adsorbent, for ion-exchange, as a catalyst and/or as a catalyst support, preferably as a catalyst for the selective catalytic reduction (SCR) of nitrogen oxides $NO_x$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis.

DESCRIPTION OF THE FIGURES

FIGS. 1, 2a, 3a, 4a, and 5a respectively show the X-ray diffraction pattern (measured using Cu K alpha-1 radiation) of the crystalline materials obtained according to Examples 1, 2, 3, 5, and 6, respectively, wherein the line pattern of the CHA-type framework has been further included in FIGS. 1, 2a, 3a, and 4a for comparison. In the figures, the angle 2 theta in ° is shown along the abscissa and the intensities are plotted along the ordinate.

FIGS. 2b, 3b, 4b, and 5b display the IR-spectra obtained for the crystalline material obtained according to Examples 2, 3, 5, and 6, respectively. In the figures, the wave-numbers in $cm^{-1}$ is shown along the abscissa, and the absorbance is plotted along the ordinate.

Figure 2A:
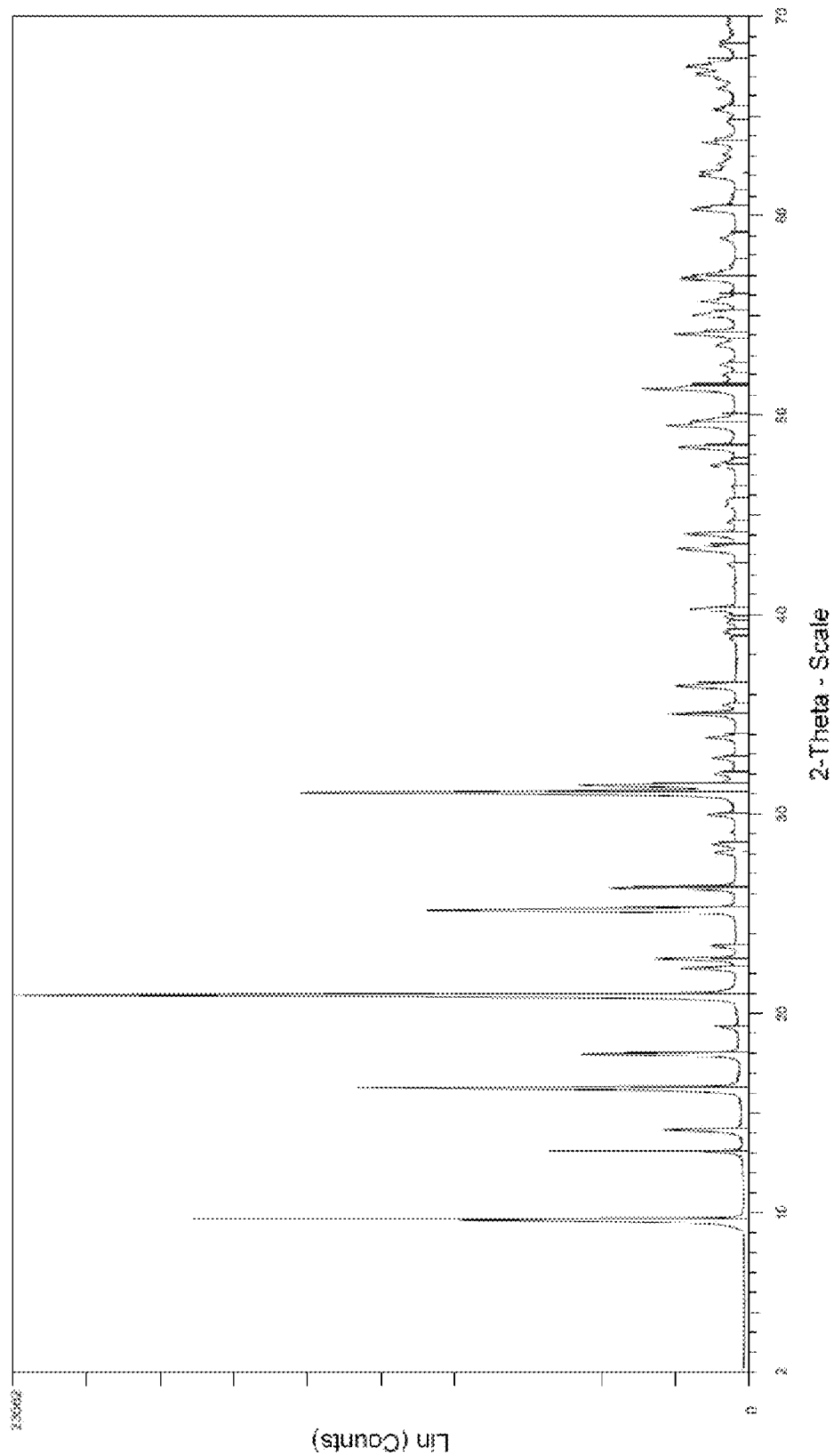
Figure 2B:
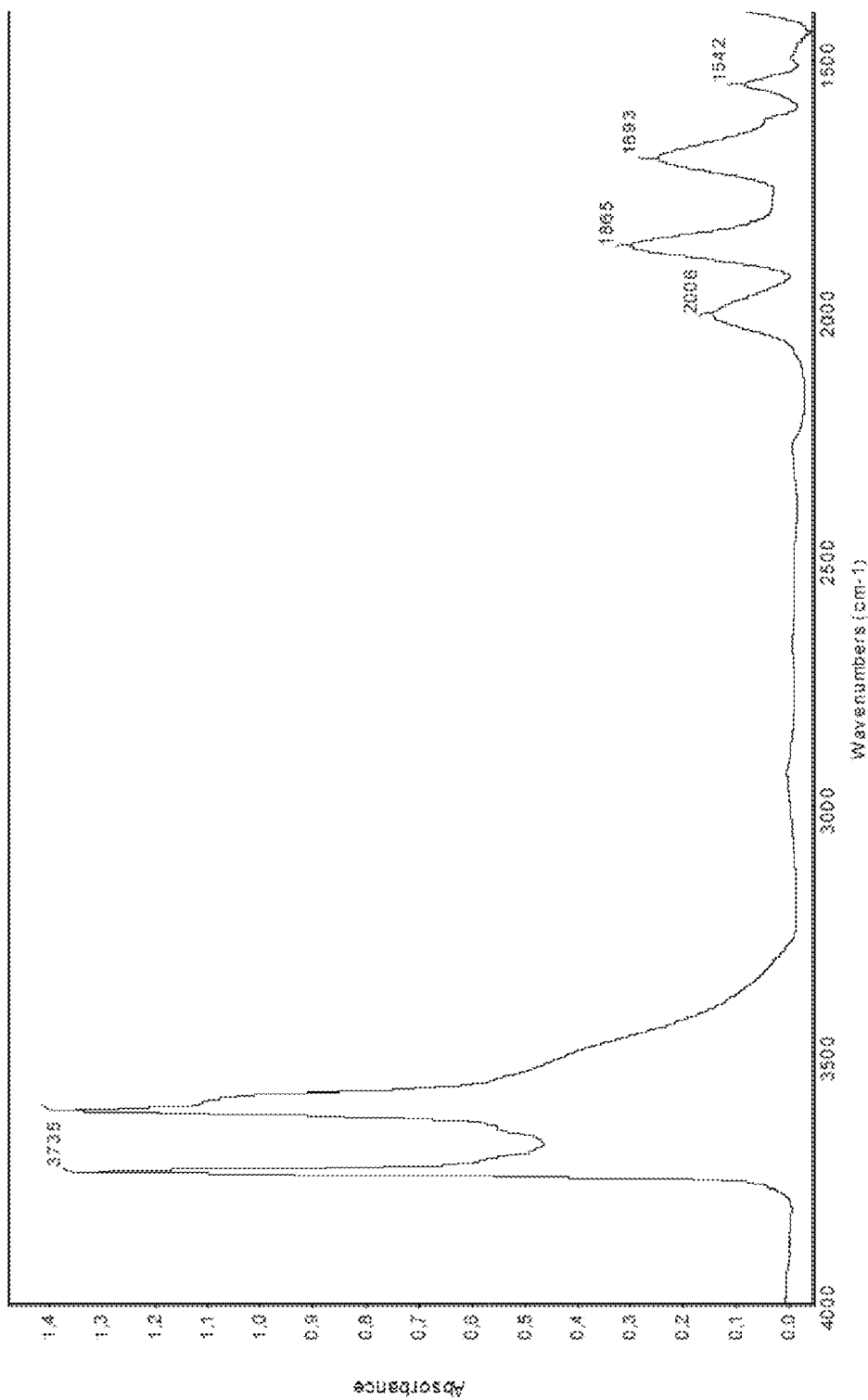
FIGS. 2b, 3b, 4b, and 5b display the IR-spectra obtained for the crystalline material obtained according to one or more embodiments of the invention.
Figure 2C:
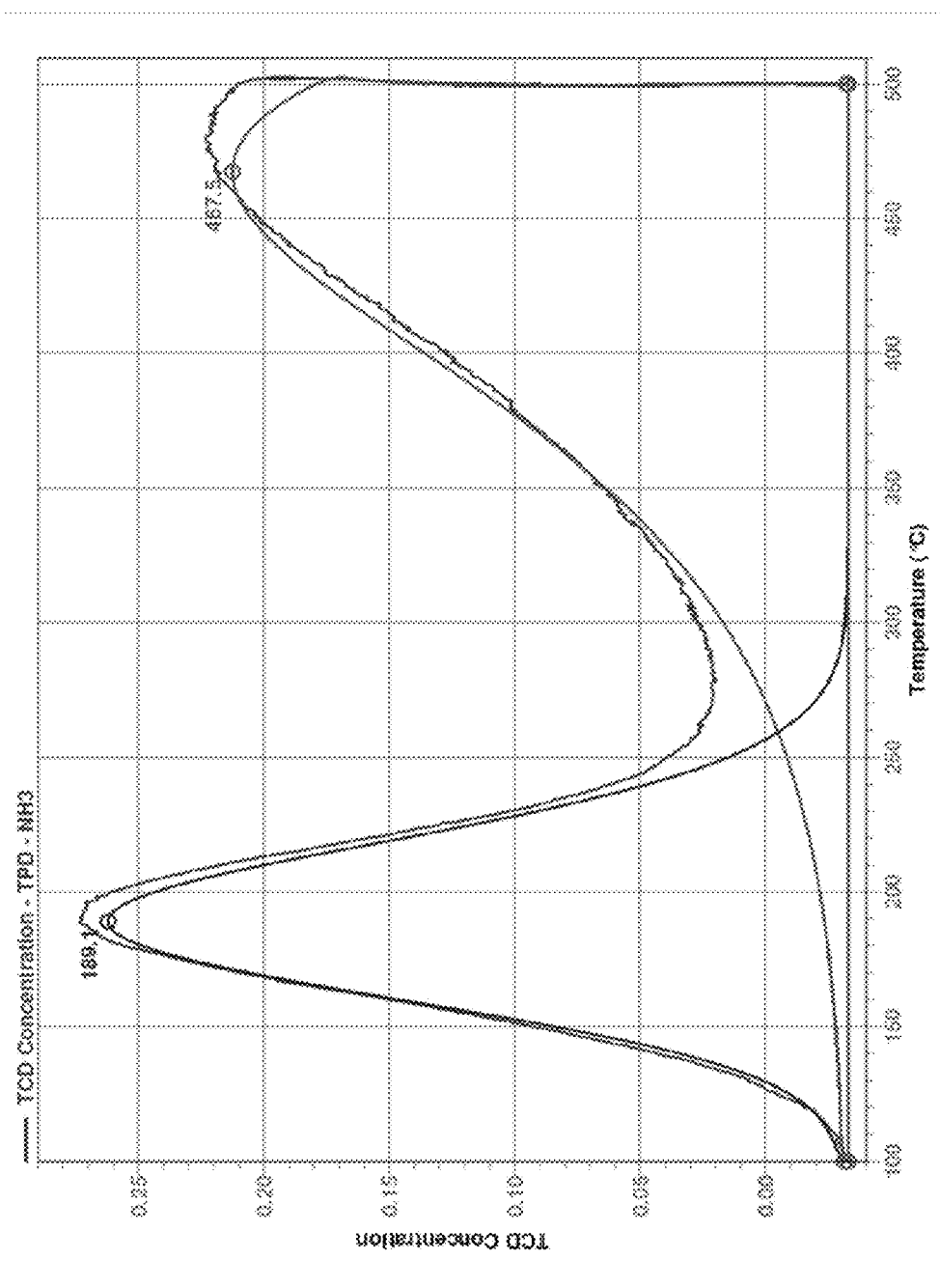
FIGS. 2c, 3c and 4c display the temperature-programmed desorption ($NH_3$-TPD) obtained for the crystalline material obtained according to one or more embodiments of the invention.
Figure 3A:
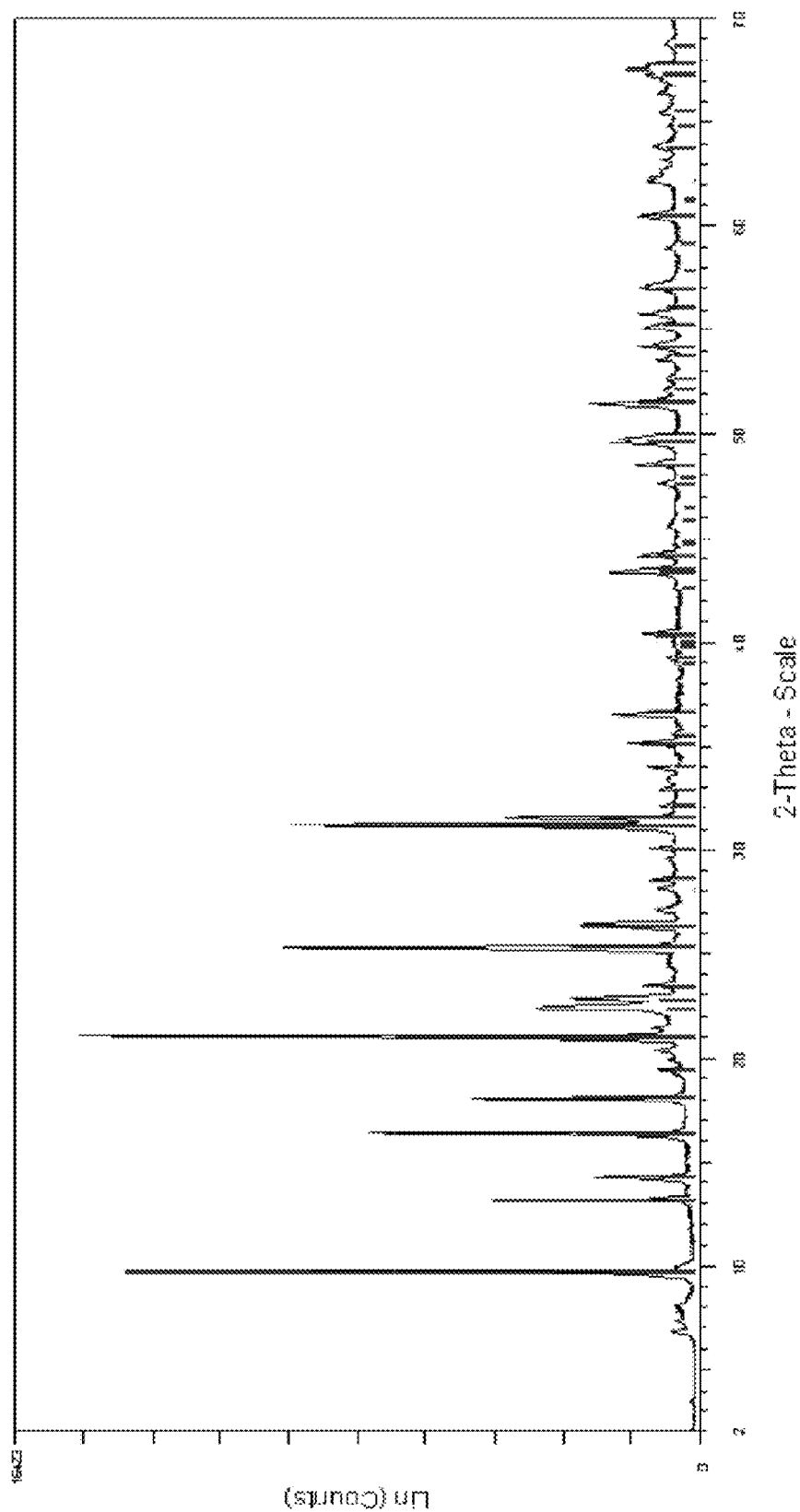
Figure 3B:
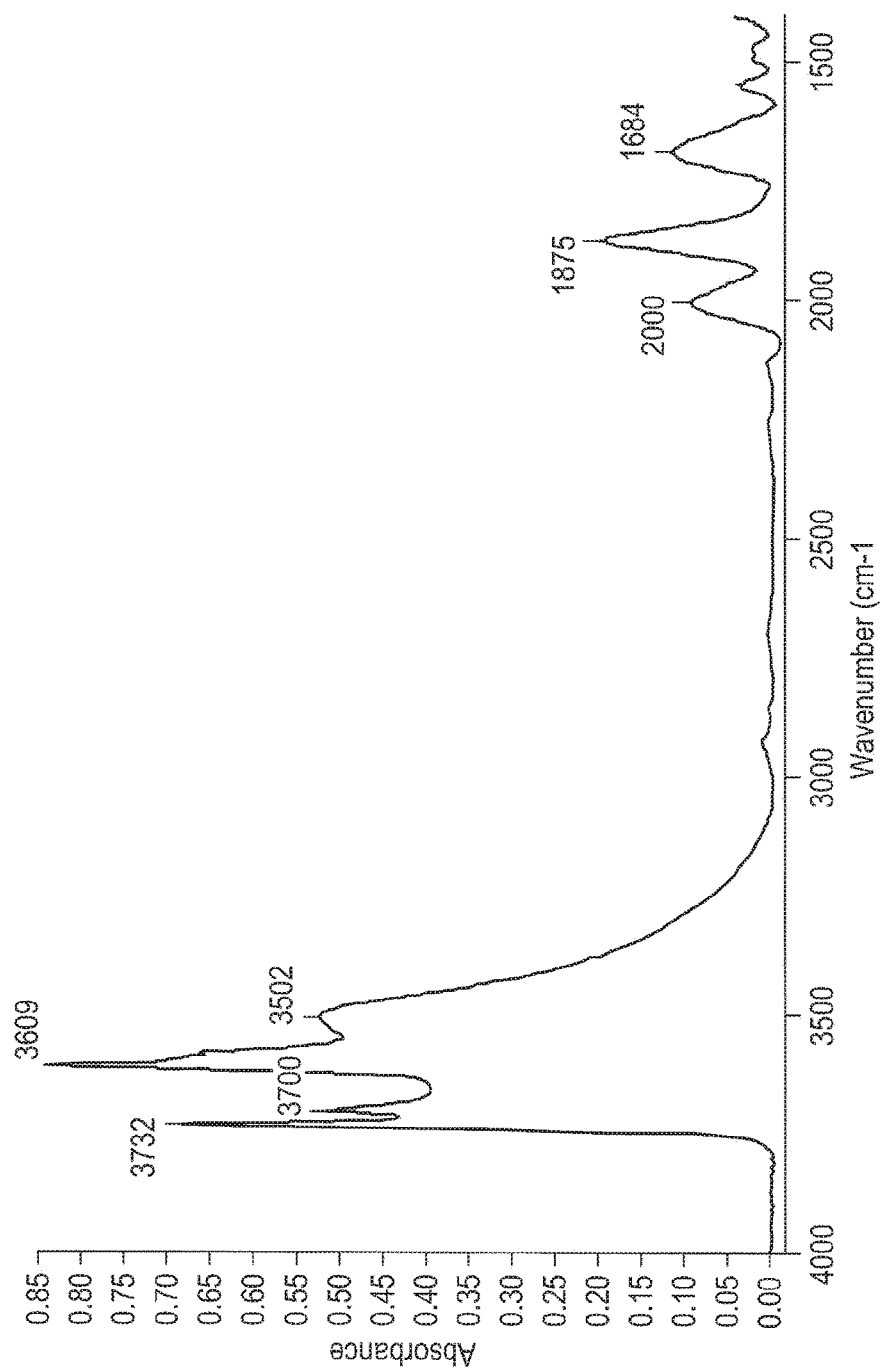
Figure 3C:
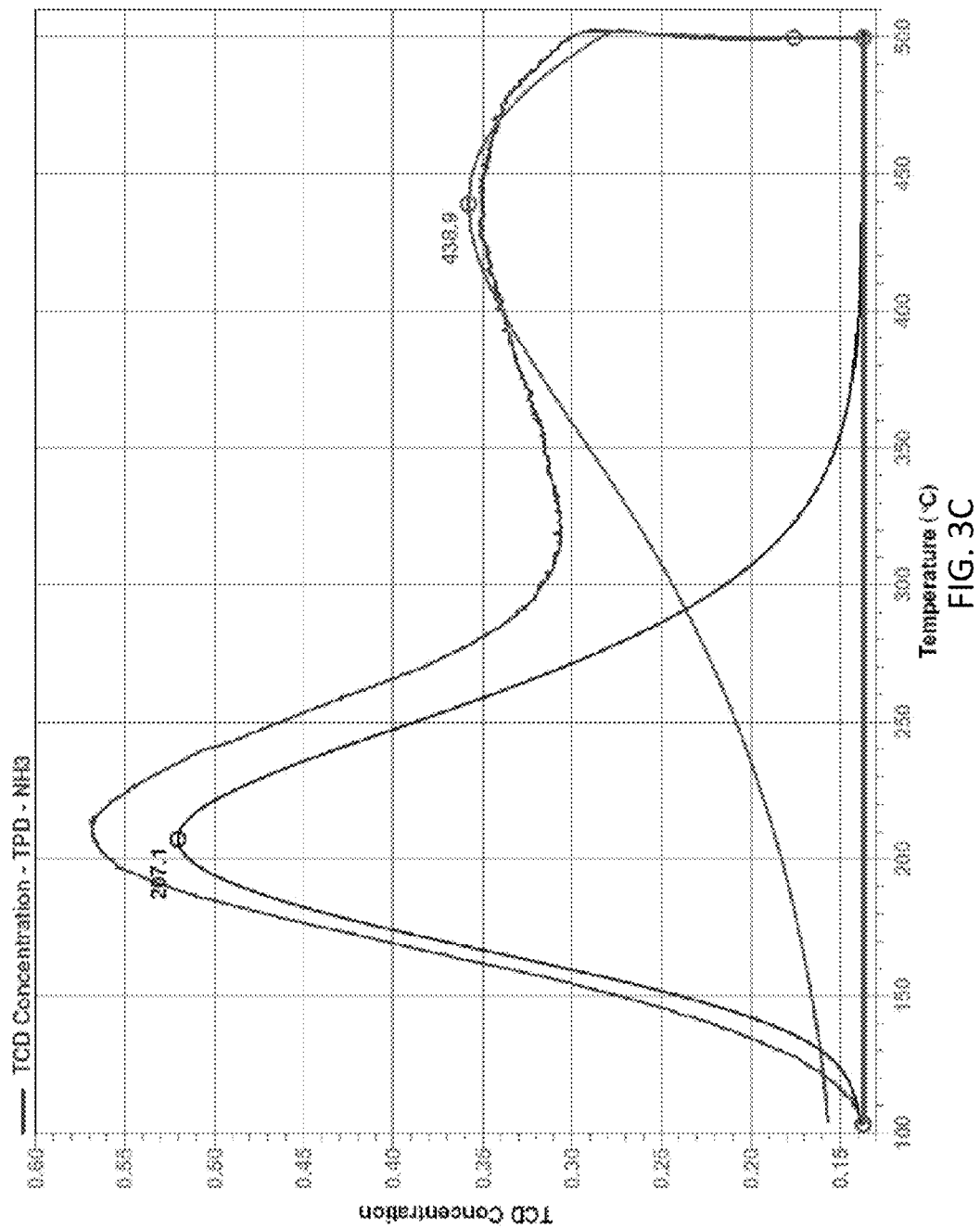
Figure 4A:
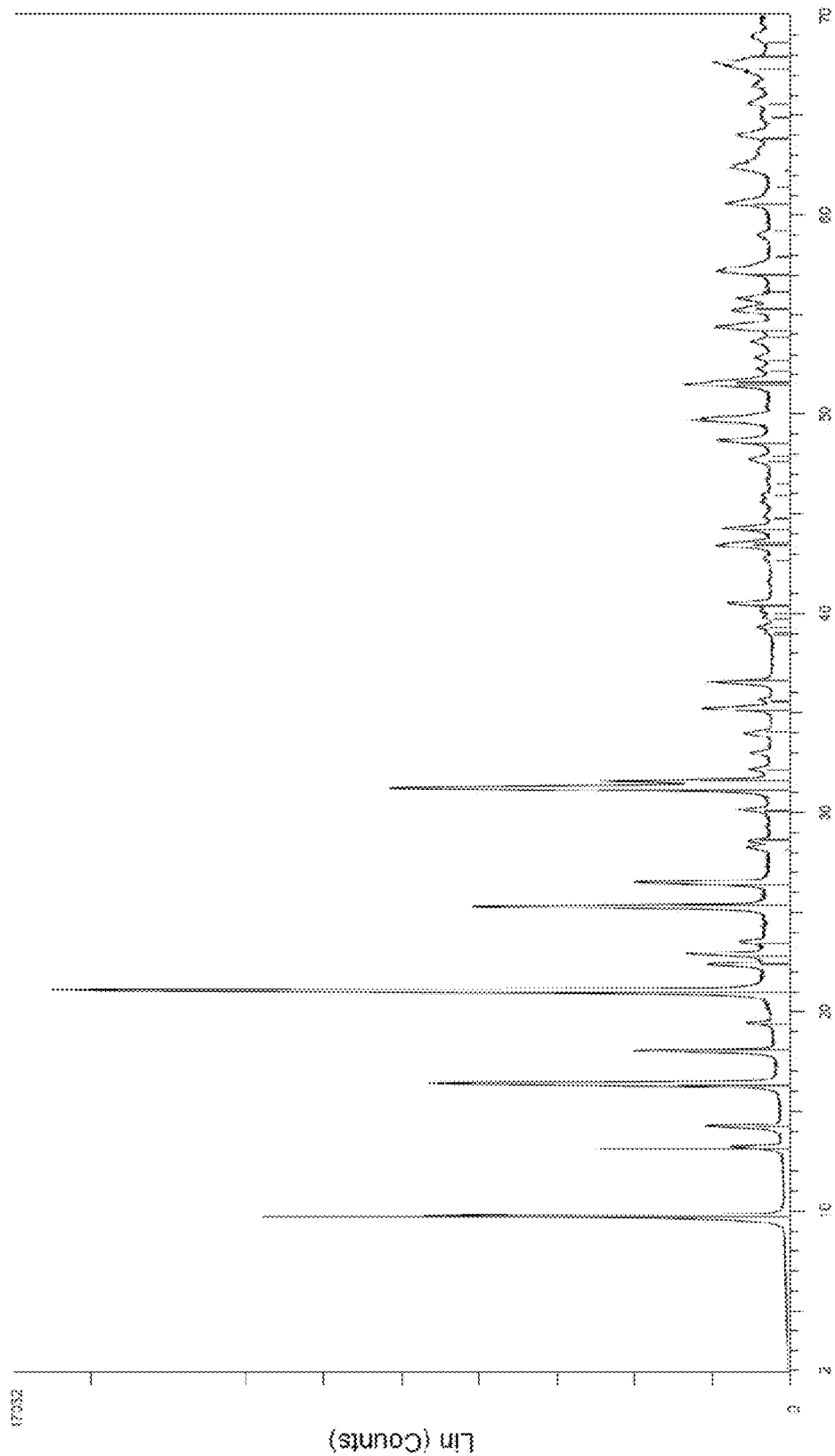
Figure 4B:
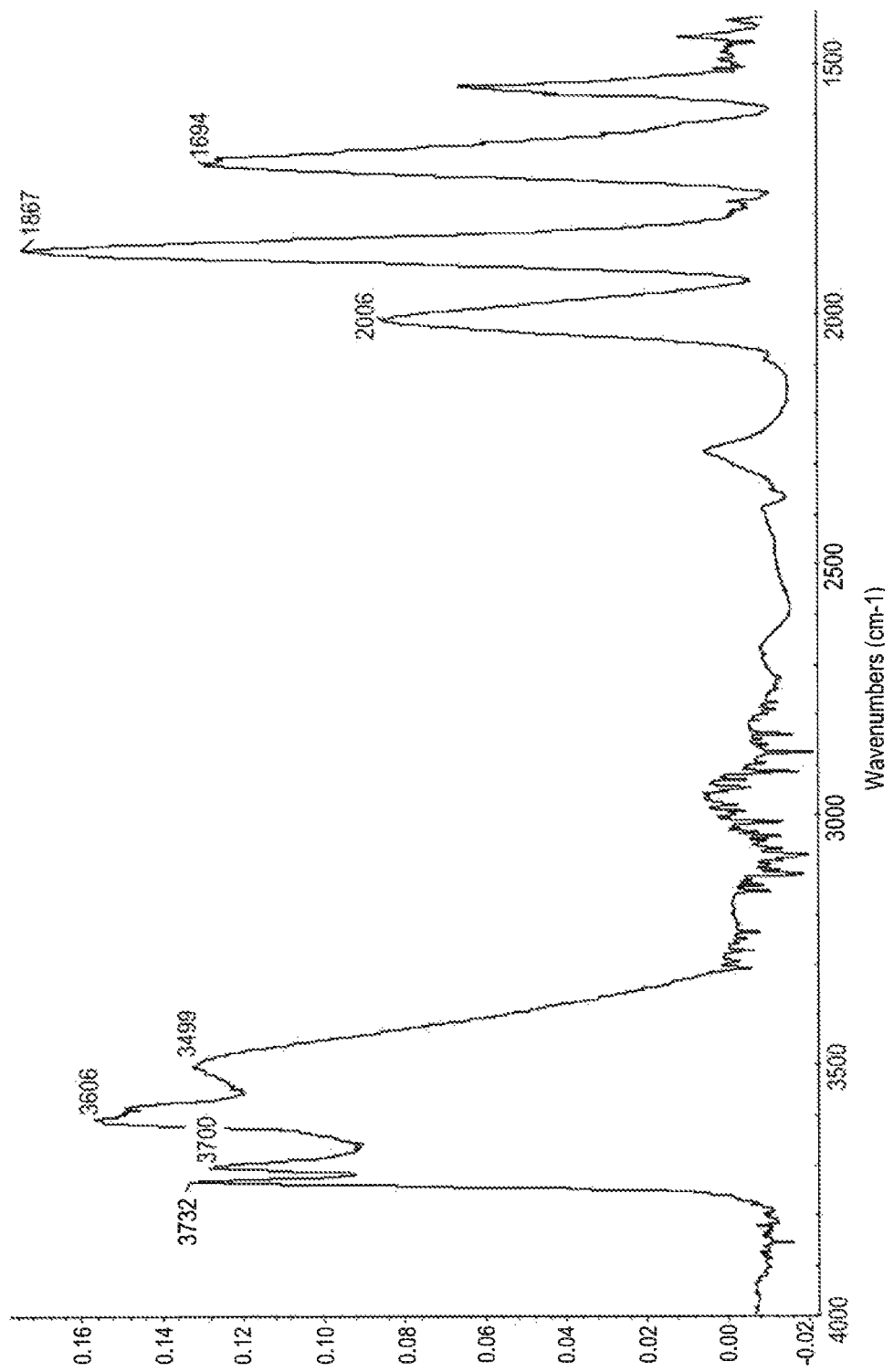
Figure 4C:
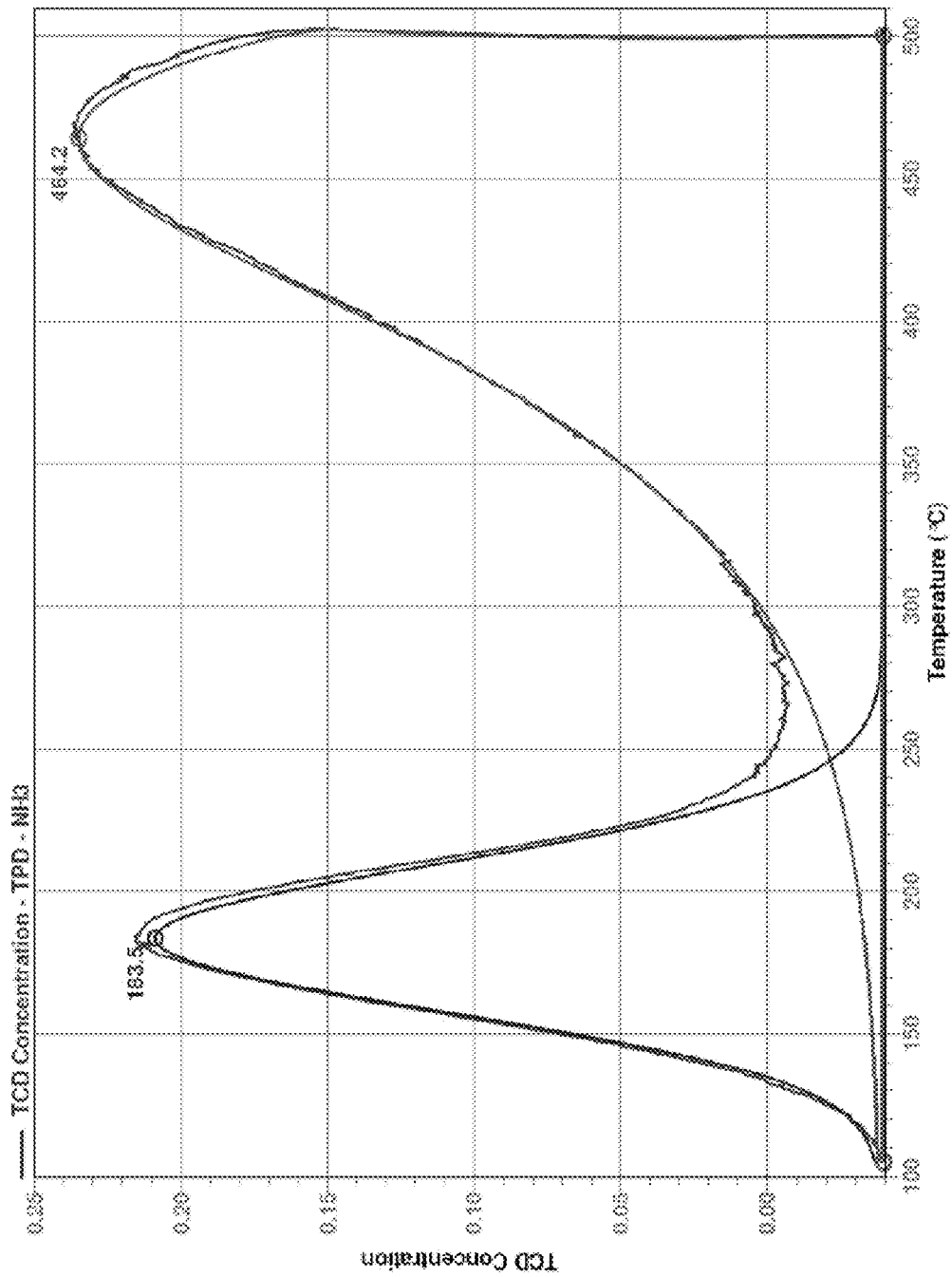

FIGS. 2c, 3c and 4c display the temperature-programmed desorption ($NH_3$-TPD) obtained for the crystalline material obtained according to Examples 2, 3and 5, respectively. In the figures, the temperature in ° C. is shown along the abscissa, and the concentration of desorbed ammonia as measured by the thermal conductivity detector (TCD) is plotted along the ordinate.

Figure 6:
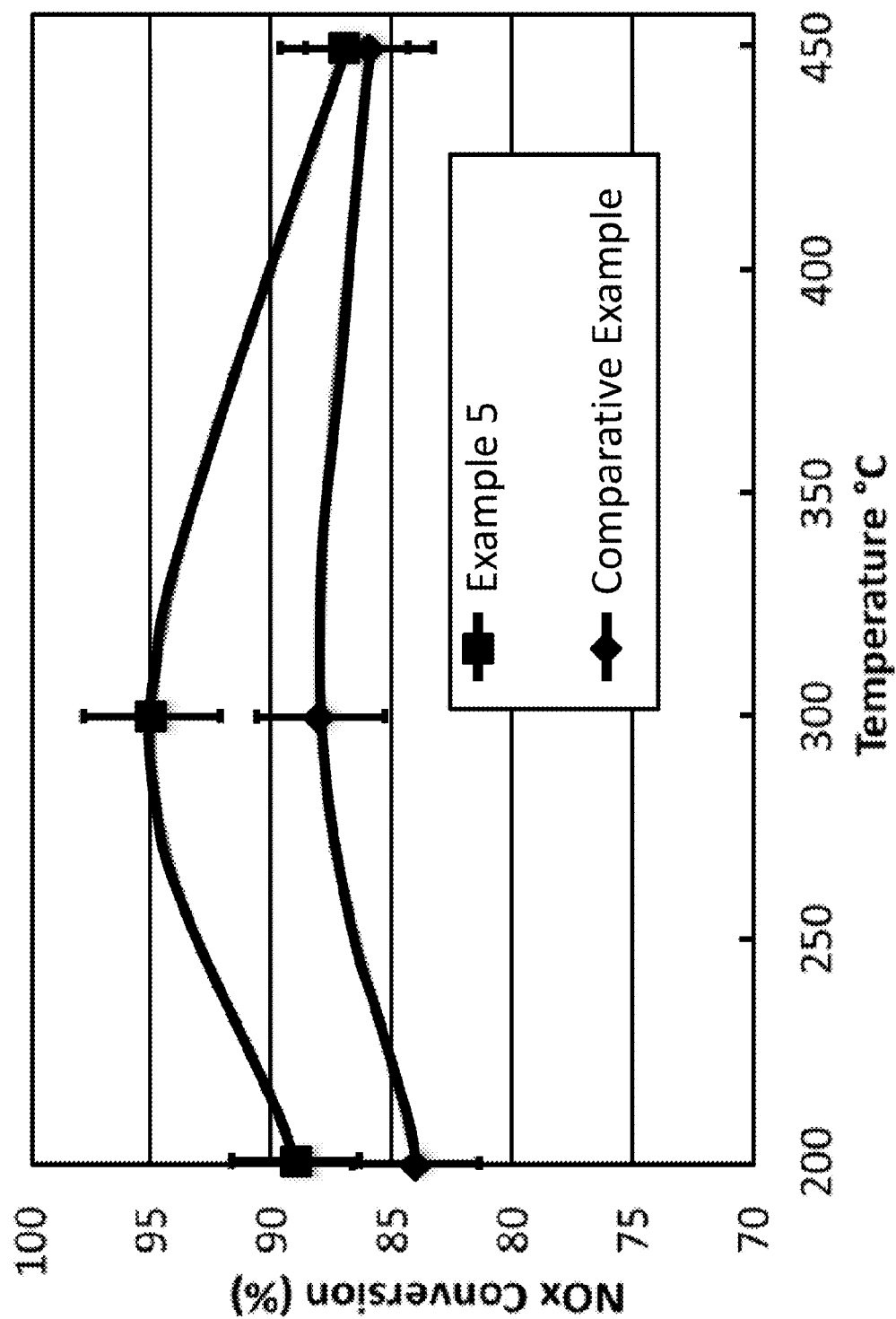
FIGS. 6, 7, and 8 display results from catalyst testing in $NO_x$ conversion performed on the copper-exchanged zeolitic materials obtained according to one or more embodiments of the invention.
Figure 7:
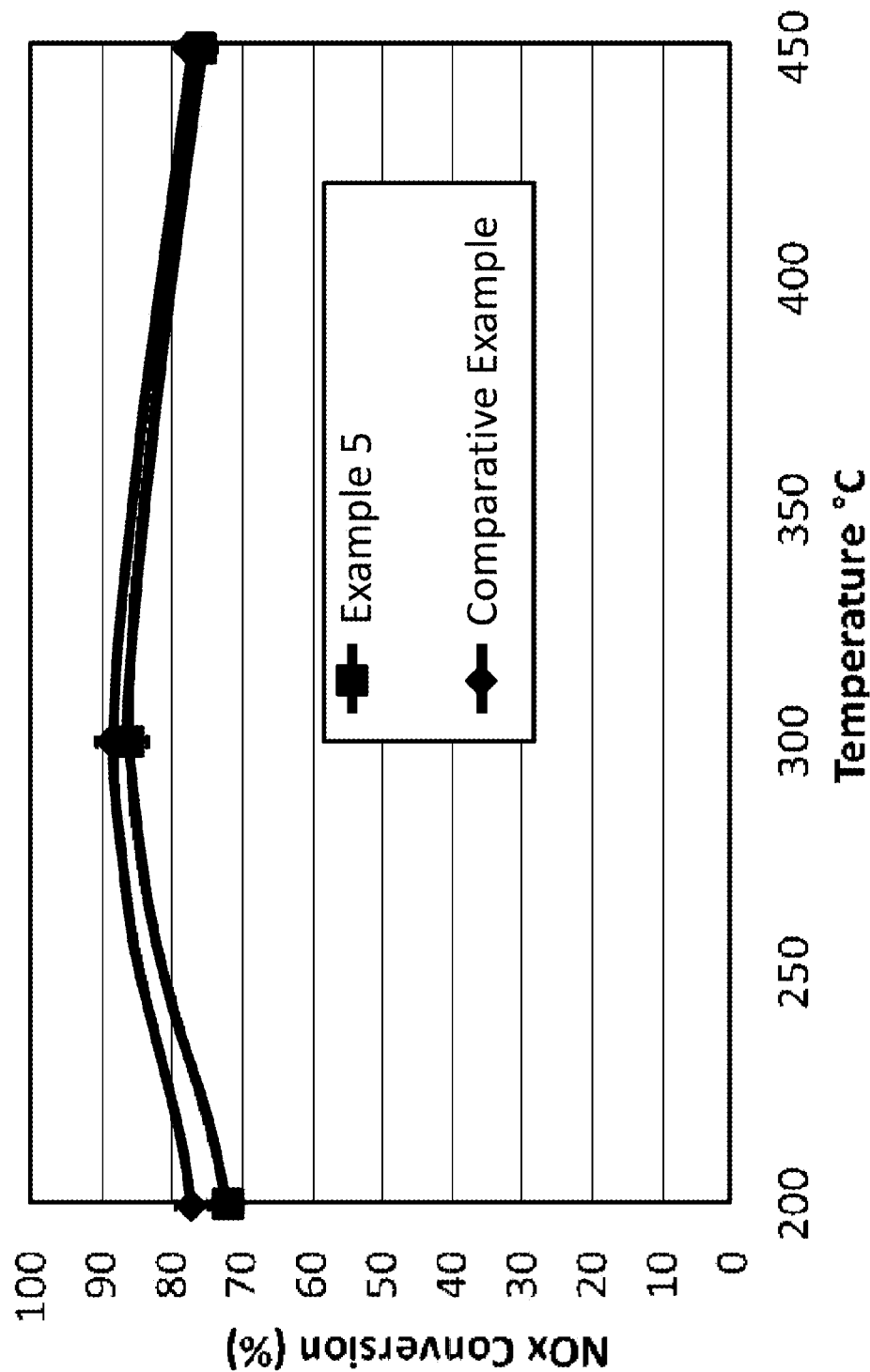
Figure 8:
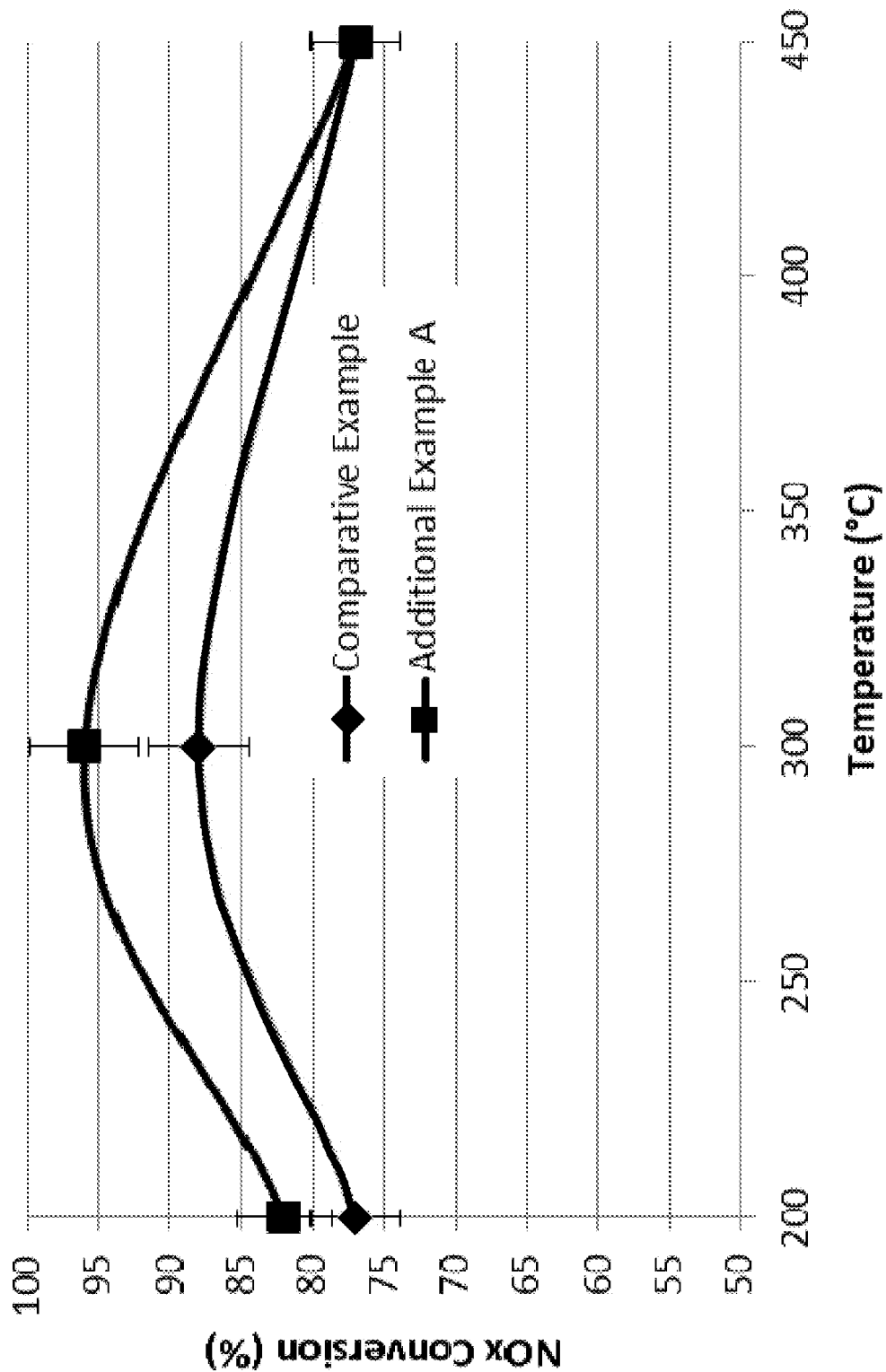

FIGS. 6, 7, and 8 display results from catalyst testing in $NO_x$ conversion performed on the copper-exchanged zeolitic material according to Examples 5 and 6, respectively, after forming to a shaped body compared to the comparative example described in Example 7. In FIGS. 7 and 8, the results are shown using samples subject to an aging treatment as described in Example 7. In the figures, the temperature in ° C. is shown along the abscissa, and the $NO_x$ conversion rate in % is plotted along the ordinate.

EXAMPLES

X-ray diffraction experiments on the powdered materials were performed using an Advance D8 Series 2 Diffractometer (Bruker/AXS) equipped with a Sol-X detector using the Cu K alpha-1 radiation.

$^{27}Al$ MAS solid-state NMR experiments were measured by direct excitation with 15°-pulse under 10 kHz Magic Angle Spinning using 250 ms recycle delay and 20 ms acquisition. The data was processed with 50 Hz exponential line broadening.

The IR-spectra were obtained from samples free of a carrier material, wherein said sample were heated at 300° C. in high vacuum for 3 h prior to measurement. The measurements were performed using a Nicolet 6700 spectrometer in a high vacuum measurement cell with $CaF_2$ windows. The obtained data was transformed to absorbance values, and the analysis was performed on the spectra after base line correction.

Example 1

47.8 g of a 50% aqueous solution of trimethylcyclohexylammonium hydroxide (TMCAOH) were mixed with 4.02 g of $Al_2(SO_4)_3*18 H_2O$ and 15.08 ml 1M NaOH in $H_2O$. Afterwards 18.1 g of fumed silica (Aerosil 200) were added stepwise to the stirred mixture. The resulting gel was placed in a sealed autoclave with a total volume of 0.25 L which was then heated to 150° C. for 96 h. After cooling down to room temperature, the obtained product was separated by centrifugation and washed four times with 100 ml $H_2O$, respectively. Afterwards, the material was dried for 10 h under air at 120° C., resulting in 12.6 g of a white powder. The powder was then calcined under air by heating it up with a rate of 1° C./min to 550° C. and held at that temperature for 5 h.

The XRD-pattern of the product is displayed in FIG. 1 and reveals a zeolitic material having the CHA-type structure as the single crystal phase. From the $N_2$- and Ar-sorption measurements the surface area (BET) was determined with 642 $m^2$/g, and the maximum pore volume (Horvath-Kawazoe) is calculated to 0.27 $cm^3$/g and median pore width to 0.62 nm. The elemental analysis reveals a composition of 2.4 wt.-% Al, 28 wt.-% Si and 0.64 wt.-% Na.

Example 2

755.2 g trimethylcyclohexylammonium hydroxide (55.8 wt.-% in $H_2O$) were mixed with 70.53 g $Al_2(SO_4)_3*18 H_2O$ and 264.56 ml 1M NaOH in $H_2O$. Afterwards 317.55 g of fumed silica (Aerosil 200) were added stepwise to the stirred mixture. The resulting gel was placed in a sealed autoclave with a total volume of 2.5 L and heated to 120° C. for 96 h. After cooling down to room temperature, the obtained product was separated by centrifugation and washed four times with 800 ml $H_2O$, respectively. Afterwards, the material was dried for 10 h under air at 120° C., resulting in 122 g of a white powder. The powder was then calcined under air by heating it up with a rate of 1K/min to 550° C. and holding it at that temperature for 5 h.

The XRD-pattern of the product is displayed in FIG. 2a and reveals a zeolitic material having the CHA-type structure as the single crystalline phase.

The sample was then converted to the H-form via an ion-exchange procedure, thus affording a final product having a composition of 2.5 wt-% Al, 38.0 wt-% Si and <0.01 wt-% Na. Accordingly, the Si:Al ratio of the final product in its H-form was 15.2. The sample displayed a crystallinity of 80% and displayed an average crystal size of 170 nm.

The $^{27}Al$ MAS NMR spectrum of the sample displayed a first peak at 56.2 ppm and a second peak at −2.8 ppm wherein integration of the first and second signal intensities revealed a ratio of the integration values first:second signal of 1:0.12.

The IR-spectrum of the product obtained from Example 2 is shown in FIG. 2b, wherein amongst others absorption bands having maxima at 3,609 $cm^{-1}$ and 1,865 $cm^{-1}$ may be seen having maximum absorbance values of 1.33 and 0.33, respectively. The maximum absorbance at 3,609 $cm^{-1}$ is tentatively attributed to Bronsted acid Si—OH sites.

$NH_3$-TPD was performed on the sample of Example 2, the result of which is displayed in FIG. 2c. Analysis of the data affords a concentration of 0.35 mmol/g of weak acid sites and a concentration of 0.68 mmol/g of strong acid sites, thus affording a total $H^+$-concentration of 1.03 mmol/g. This contrasts with the $NH_3$-TPD which was performed using a Chabazite of the prior art obtained according to US 2003/0069449 A1 which afforded a concentration of 0.19 mmol/g of weak acid sites and 0.43 mmol/g of strong acid sites for a total H$^+$-concentration of 0.62 mmol/g.

Example 3

47.8 g of trimethylcyclohexylammonium hydroxide (66.8 wt-% in H$_2$O) were mixed with 4.02 g Al$_2$(SO$_4$)$_3$*18 H$_2$O and 0.6 g of NaOH. Afterwards 45.25 g of colloidal silica (LUDOX AS40; colloidal SiO$_2$ 40 wt-% in H$_2$O) were added to the stirred mixture. The resulting gel was placed in a sealed autoclave with a total volume of 0.25 L which was then heated to 170° C. for 96 h. After cooling down to room temperature, the obtained product was separated by filtration and washed three times with 400 ml of distilled water. Afterwards, the material was dried for 10 h under air at 120° C., affording 17.6 g of white powder. The powder was then calcined under air by heating it up at a rate of 1° C./min to 550° C., and holding it at that temperature for 5 h.

The XRD-pattern of the product is displayed in FIG. 3a and reveals a zeolitic material having the CHA-type structure as the single crystalline phase. The elemental analysis of the product revealed a composition of 1.8 wt.-% Al, 35.5 wt.-% Si and 0.36 wt.-% Na.

The sample was then converted to the H-form via an ion-exchange procedure, thus affording a final product having a composition of 1.9 wt.-% Al, 43.0 wt.-% Si and <0.01 wt.-% Na. Accordingly, the Si:Al ratio of the final product in its H-form was 22.6. The sample displayed a crystallinity of 90% and displayed an average crystal size of >100 nm.

The $^{27}$Al MAS NMR spectrum of the product obtained from Example 3 displayed a first peak at 54.1 ppm and a second peak at −3.4 ppm wherein integration of the first and second signal intensities revealed a ratio of the integration values first:second signal of 1:0.11.

The IR-spectrum of the sample is shown in FIG. 3b, wherein amongst others absorption bands having maxima at 3,700 cm$^{-1}$, 3,609 cm$^{-1}$, 3,502 cm$^{-1}$, and 1,875 cm$^{-1}$ may be seen having maximum absorbance values of 0.51, 0.83, 0.53, and 0.20, respectively. As for the IR-spectrum of Example 2, the maximum absorbance at 3,609 cm$^{-1}$ is again tentatively attributed to Bronsted acid Si—OH sites. Furthermore, the absorption bands at 3,700 cm$^{-1}$ and 3,502 cm$^{-1}$ are attributed to terminal Si—OH and silanol nests, respectively.

NH$_3$-TPD was performed on the sample of Example 3, the result of which is displayed in FIG. 3c. Analysis of the data affords a concentration of 0.45 mmol/g of weak acid sites and a concentration of 0.54 mmol/g of strong acid sites, thus affording a total H$^+$-concentration of 0.99 mmol/g. This again contrasts with the NH$_3$-TPD which was performed using a Chabazite of the prior art obtained according to US 2003/0069449 A1 which afforded the values indicated in Example 2. Thus, as discussed above for Example 2, compared to sample from the prior art it has quite surprisingly been found that a higher concentration of both weak and strong acid sites are observed for the inventive material of the present example. In the present case, this is all the more surprising considering the fact that the inventive sample displays a significantly higher Si:Al ratio of 22.6 than the sample of the prior art, which displays an Si:Al ratio of merely 17.1.

Example 4

0.444 g Al$_2$(SO$_4$)$_3$*18 H$_2$O and 5.28 g of trimethylcyclohexylammonium hydroxide (50 wt % in H$_2$O) were stirred for about 30 minutes. Afterwards, 4 g of colloidal silica (Ludox TM-50; 50 wt % SiO$_2$) were added and the mixture stirred for 2 hours to result in a white, pourable precursor solution. The precursor solution was then filled into a 20 ml teflon-lined autoclave and reacted for three days at 150° C. in a preheated oven. After cooling down to room temperature, the obtained product was separated by centrifugation and washed four times with 100 ml H$_2$O, respectively. Afterwards, the material was dried for 10 h under air at 120° C., resulting in 2.0 g of a white powder.

The XRD-pattern of the product revealed a zeolitic material having the CHA-type structure as the single crystalline phase.

Example 5

Preparation with Seeding Material from Example 2

47.8 g trimethylcyclohexylammonium hydroxide (19.9 wt.-% in H$_2$O) were mixed with 4.02 g Al$_2$(SO$_4$)$_3$*18 H$_2$O and 15.08 ml 1 M NaOH. Afterwards 45.25 g of colloidal silica (LUDOX AS40; 40 wt.-% colloidal SiO$_2$ in H$_2$O) were added to the stirred mixture. Finally 0.36 g of the product from Example 2 was dispersed in the reaction mixture. The resulting gel was placed in a sealed autoclave with a total volume of 0.25 L which was then heated to 170° C. for 144 h. After cooling down to room temperature, the obtained product was separated by filtration and was washed three times with 400 ml distilled H$_2$O. Afterwards, the material is dried for 10 h under air at 120° C., affording 22.3 g of a white crystalline powder. The powder was then calcined under air by heating it up with a rate of 1° C./min to 550° C. and holding it at that temperature for 5 h.

The XRD-pattern of the product is displayed in FIG. 4a and reveals a zeolitic material having the CHA-type structure as the single crystalline phase.

The sample was then converted to the H-form via an ion-exchange procedure, thus affording a final product with a composition of 1.7 wt-% Al, 41.5 wt-% Si and <0.01 wt-% Na as determined by elemental analysis. Accordingly, the Si:Al ratio of the final product in its H-form was 24.4. The sample displayed a crystallinity of 87% and displayed an average crystal size of >100 nm.

The $^{27}$Al MAS NMR spectrum of the product obtained from Example 5 displayed a first peak at 56.0 ppm and a second peak at −3.4 ppm wherein integration of the first and second signal intensities revealed a ratio of the integration values first:second signal of 1:0.027.

The IR-spectrum of the sample is shown in FIG. 4b, wherein amongst others absorption bands having maxima at 3,700 cm$^{-1}$, 3,606 cm$^{-1}$, 3,499 cm$^{-1}$, and 1,867 cm$^{-1}$ may be seen having maximum absorbance values of 0.41, 0.17, 0.14, and 0.19, respectively. As for the IR-spectrum of Examples 2 and 3, the maximum absorbance at 3,606 cm$^{-1}$ is again tentatively attributed to Bronsted acid Si—OH sites. Furthermore, as for Example 3, the absorption bands at 3,700 cm$^{-1}$ and 3,499 cm$^{-1}$ are attributed to terminal Si—OH and silanol nests, respectively.

NH$_3$-TPD was performed on the sample of Example 5, the result of which is displayed in FIG. 4c. Analysis of the data affords a concentration of 0.22 mmol/g of weak acid sites and a concentration of 0.55 mmol/g of strong acid sites, thus affording a total H$^+$-concentration of 0.77 mmol/g. This again contrasts with the NH$_3$-TPD which was performed using a Chabazite of the prior art obtained according to US 2003/0069449 A1 which afforded the values indicated in Example 2. Furthermore, as discussed above for Example 3, these results are highly unexpected considering the fact that the inventive sample displays a significantly higher Si:Al ratio of 24.4 than the sample of the prior art.

36.16 g of the zeolitic material obtained from Example 5 were dispersed in 361.0 g ammonium nitrate solution (10 wt-%) in $H_2O$ and heated under stirring to 60° C. for 2 h. Afterwards, the solid was filtered and washed with $H_2O$ to remove residual nitrate ions. The ion exchange step was then repeated one more time. Finally, the resulting zeolitic material was dried under air at 120° C. for 10 h. The elemental analysis revealed a decreased sodium content (0.3 wt-%) in the sample.

31.2 g of the powder obtained from ion-exchange was then dispersed in a mixture of 393.7 g $H_2O$, 50 g ethanol and 4.01 g copper(II)acetate and heated under stirring to 60° C. for 1 h. The resulting light blue Cu-CHA was separated from the solution by filtration and was washed four times with 300 ml $H_2O$, respectively. The product was characterized by elemental analysis, indicating the successful incorporation of Cu ions (3.0 wt-%) and the further removal of residual sodium ions to 0.01 wt-% in the prepared material.

The copper-exchange zeolitic material was then formed to a shaped body by mixing 30 g thereof with 1.5 g polyethyleneoxide and 11 ml $H_2O$ in a kneader. The resulting paste was pressed through an extruding hole of 1.5 mm with a maximum pressure of 10 bar. The obtained extrudates were dried at 120° C. for 5 h and calcined at 540° C. for 5 h. The extrudate was then sized into pellets and sieved to separate pellet sizes of 0.5-1 mm. This fraction was then used for testing in the reactor. The resulting light blue extrudates were analyzed by $N_2$-sorption measurements at 77K. Based on the obtained isotherm, the surface area was calculated by BET to 632 $m^2/g$.

Example 6

Preparation with Na-Chabazite as Seeding Material 291.3 g trimethylcyclohexylammonium hydroxide (35.0 wt-% in $H_2O$) were mixed with 42.88 g $Al_2(SO_4)_3$*18 $H_2O$ and 160.84 ml 1 M NaOH. Afterwards, 482.62 g colloidal silica (LUDOX AS40; 40 wt-% colloidal $SiO_2$ in $H_2O$) were added to the stirred mixture. Finally, 3.83 g of Chabazite (Na-form; Si:Al molar ratio=15) were dispersed in the reaction mixture. The resulting gel was placed in a sealed autoclave with a total volume of 2.5 L which was then heated to 170° C. for 48 h. After cooling down to room temperature, the obtained product was separated by filtration and was washed three times with 2000 ml distilled $H_2O$. Afterwards, the material was dried for 10 h under air at 120° C., affording 245.5 g of a white crystalline powder. The powder was then calcined under air by heating it up with a rate of 1° C./min to 550° C. and holding it at that temperature for 5 h.

Figure 5A:
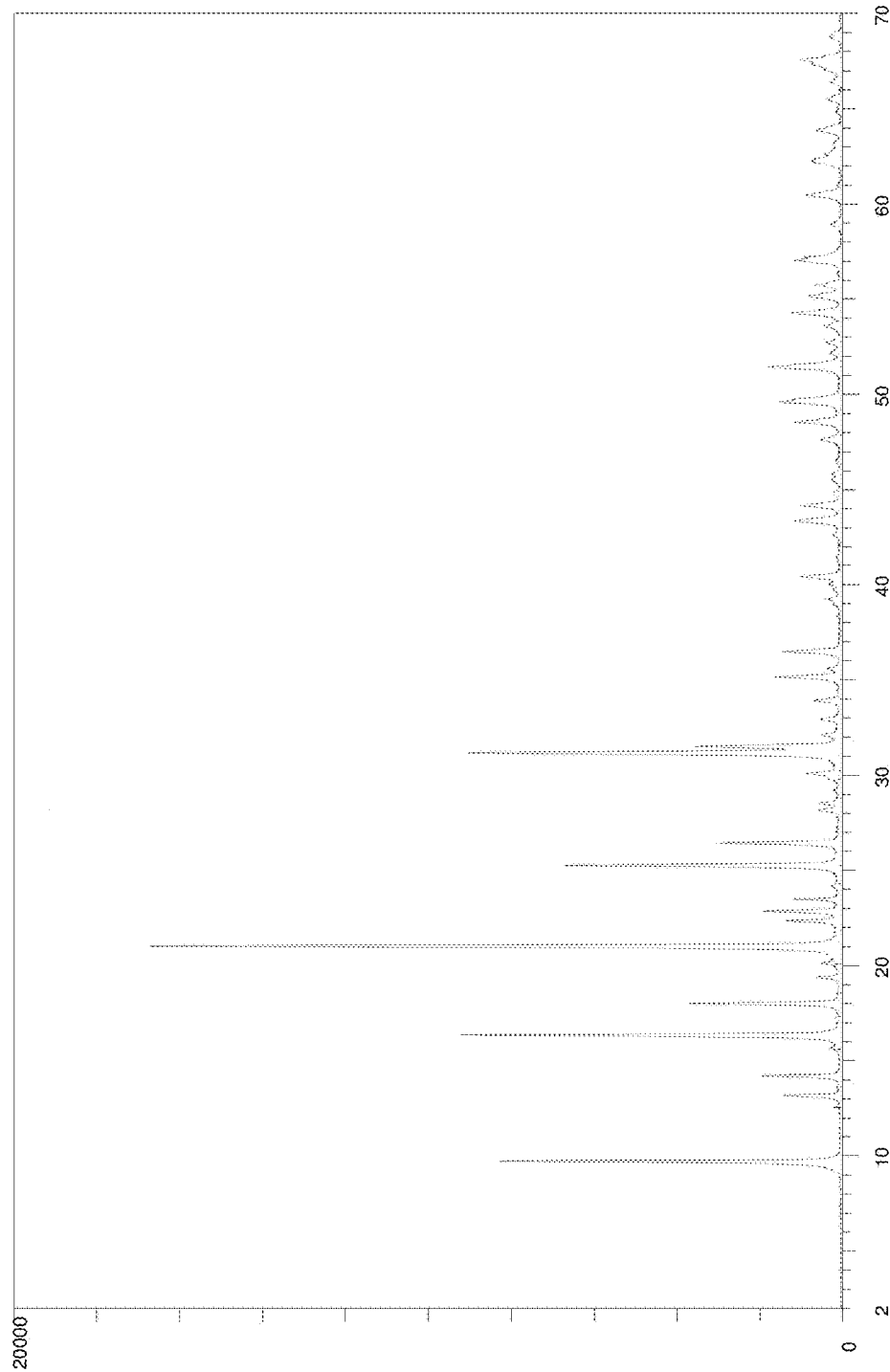

The XRD-pattern of the product is displayed in FIG. 5*a* and reveals a zeolitic material having the CHA-type structure as the single crystalline phase.

Elemental analysis of the product revealed a composition of 1.6 wt-% Al, 37.5 wt-% Si and 0.10 wt-% Na. Accordingly, the Si:Al molar ratio of the final product was 22.6.

The $^{27}$Al MAS NMR spectrum of the product obtained from Example 6 displayed a single peak at 57.6 ppm. Thus, it is apparent from the NMR spectrum of the product that no extra-framework aluminum is contained therein, the single peak observed standing for tetravalently coordinated aluminum contained in the framework structure of the zeolite.

Figure 5B:
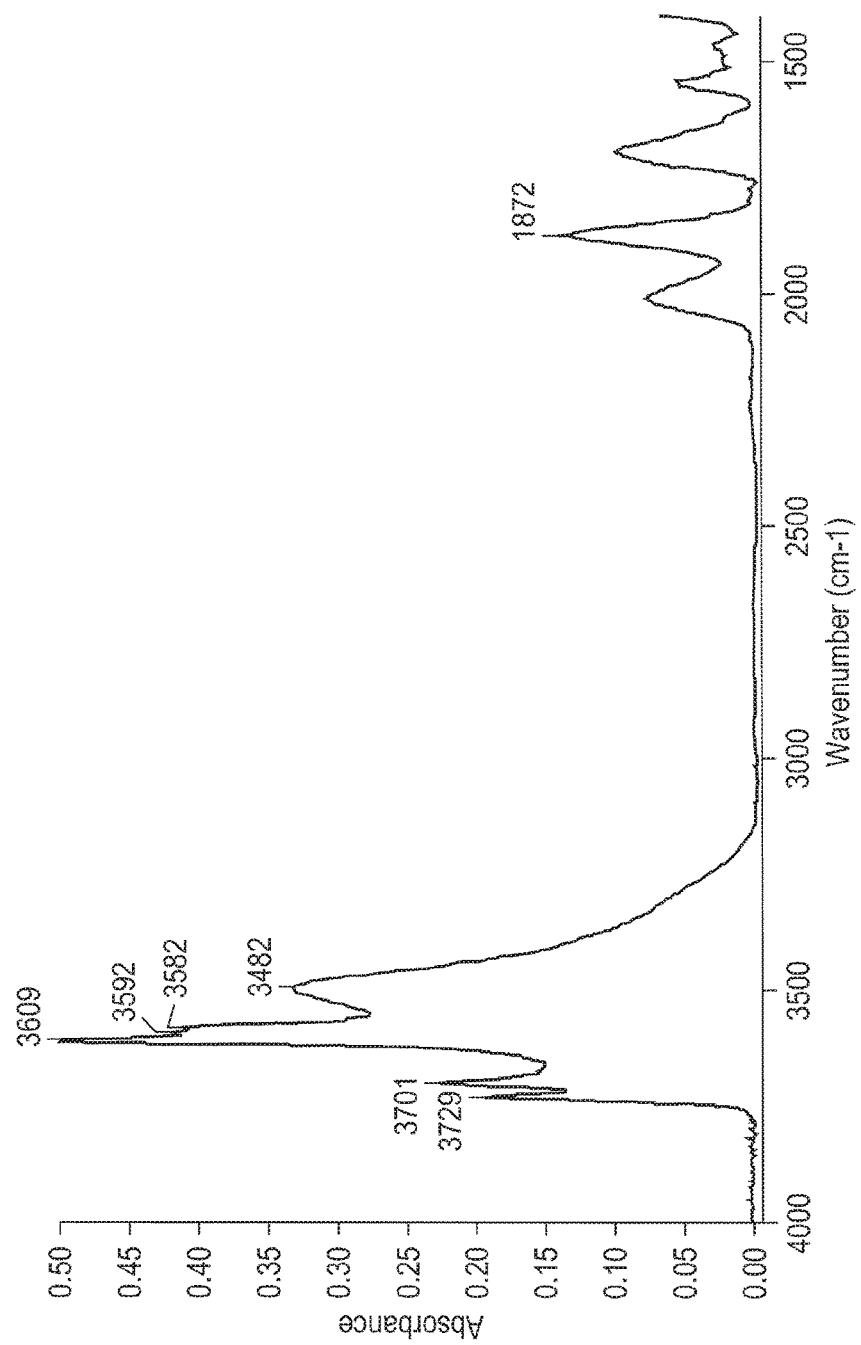

The IR-spectrum of the sample is shown in FIG. 5*b*, wherein amongst others absorption bands having maxima at 3,701 $cm^{-1}$, 3,609 $cm^{-1}$, 3,496 $cm^{-1}$, and 1,872 $cm^{-1}$ may be seen. As for the IR-spectrum of Examples 2, 3, and 5, the maximum absorbance at 3,609 $cm^{-1}$ is again tentatively attributed to Bronsted acid Si—OH sites. Furthermore, as for Example 3, the absorption bands at 3,701 $cm^{-1}$ and 3,496 $cm^{-1}$ are attributed to terminal Si—OH and silanol nests, respectively.

The zeolite product was then converted into the H-from and subsequently ion-exchanged as described in Example 5. Elemental analysis of the product revealed a composition of 1.6 wt-% Al, 2.5 wt-% Al, 37.5 wt-% Si and 0.01 wt-% Na. Accordingly, the Si:Al molar ratio of the ion-exchanged product remains unchanged compared to the sodium form directly obtained from hydrothermal synthesis. The material was also analyzed by $N_2$-sorption measurements at 77K. Based on the obtained isotherm, the surface area was calculated by BET to 490 $m^2/g$, and the Langmuir surface area to 653 $m^2/g$.

For catalyst testing in Example 7 below, a shaped body was formed using the copper-exchanged material according to the procedure described in Example 5.

Example 7

Catalyst Testing

The steps for obtaining the copper-exchange zeolite containing extrudates as described in Example 5 were respectively repeated using a Chabazite of the prior art obtained according to US 2003/0069449 A1 for obtaining the comparative example (2.9 wt.-% of Cu ions exchanged).

Respective extrudates from Example 5 and according to the comparative example were then aged in a reactor composed of a 1 mm thick steel tube (grade 1.4841 from Buhlmann Group) with diameters of 500 mm height and 18 mm internal diameter. A nickel mantle based furnace was used to heat the reactor to the target reaction temperature which was monitored by an internal thermocouple at the location of the sample. The steam was prepared by heating controlled amounts of water at 150° C. through a steel pre-steamer before mixing with the remaining gases in a static mixer. The gases together with the steam were then passed through a pre-heater to enable the target temperature. Hydrothermal aging was achieved in the aging reactor with a gas flow containing 10 percent $H_2O$, 10 percent $O_2$, balance $N_2$ at a space velocity of 12,500 hi for 6 h at 850° C., which constitutes a severe hydrothermal aging.

The SCR-test were then performed by contacting the respective samples with a gas stream containing 500 ppm NO, 500 ppm $NH_3$, 5% $H_2O$, 10% $O_2$, and balance $N_2$ at 200° C., 300° C., and 450° C., respectively. The gas hourly space velocity employed in catalyst testing was GHSV=80,000 $h^{-1}$.

Results from the catalyst testing of the extrudate samples from Example 5 and from the comparative example are shown in FIGS. 6 and 7, respectively, showing the $NO_x$ conversion of the respective extrudates prior to and after aging. Thus, as may be taken from FIG. 6 displaying the results employing the fresh catalysts, it has quite surprisingly been found that the copper-exchange zeolitic material of Example 5 according to one or more embodiments of the present invention affords a considerably higher conversion rate for the treatment of $NO_x$ reaching 95% compared to the copper-exchanged zeolitic material of the prior art which remains inferior to 90% under the same conditions. This is all the more surprising considering the fact that, as discussed in Example 5, the zeolitic material of the inventive sample displays a significantly higher Si:Al ratio of 24.4 compared to the sample of the prior art having an Si:Al ratio of 17.7.

As may be taken from the results obtained after severe aging of the respective samples, the activity of the inventive zeolitic material gradually alters over time to achieve a conversion rate comparable to that of the zeolitic material according to the prior art in the extrudates of the comparative example.

In further testing experiments, respective extrudates from Example 6 and according to the comparative example were aged in air containing 10% $H_2O$ for 6 h at 850° C., which again constitutes a severe hydrothermal aging. The aged samples were then subject to SCR-testing under the conditions outlined in the foregoing.

Results from the catalyst testing performed on the extrudate samples from Example 6 and from the comparative example aged in this manner are shown in FIG. 8. Thus, compared to the testing results performed on the catalyst samples from Example 5 and the comparative example displayed in FIG. 7, it may be taken from the results displayed in FIG. 8 that upon aging of the respective samples in air, i.e. in an atmosphere containing about twice the amount of oxygen compared to the testing of Example 5, the improvements achieved by the catalyst according to one or more embodiments of the present invention are even more pronounced. In particular, it is observed that the even after aging of the catalyst samples, the copper-exchanged catalyst obtained according to one or more embodiments of the present invention shows a clearly superior performance in the treatment of $NO_x$, even reaching a conversion rate of about 96% when conducted at 300° C. Again, as noted above relative to the comparative testing performed using the extrudate sample from Example 5, this result is very unexpected since, as shown in Example 6, the zeolitic material displays an Si:Al molar ratio of 22.6 and therefore far less reactive aluminum sites compared to the comparative sample obtained according to the prior art.

Accordingly, given the superior performance of the inventive materials both prior to and after aging as demonstrated in the foregoing, the overall conversion is considerably improved when employing the inventive catalyst, such that a highly improved catalyst may provided by one or more embodiments of the present invention compared to the zeolitic materials known from the prior art.

The invention claimed is:

1. A process for the preparation of a zeolitic material having a CHA-type framework structure comprising $YO_2$ and $X_2O_3$, wherein said process comprises the steps of:
   (1) providing a mixture comprising one or more sources for $YO_2$, one or more sources for $X_2O_3$, and one or more tetraalkylammonium cation $R^1R^2R^3R^4N^+$-containing compounds as structure directing agent;
   (2) crystallizing the mixture obtained in step (1) for obtaining a zeolitic material having a CHA-type framework structure;
wherein Y is a tetravalent element and X is a trivalent element,
wherein the mixture provided in step (1) further comprises seed crystals,
wherein $R^1$, $R^2$, and $R^3$ independently from one another stand for alkyl,
wherein $R^4$ stands for cycloalkyl, and
wherein the mixture provided in step (1) does not contain any substantial amount of a source for $Z_2O_5$, wherein Z is P, and wherein the one or more tetraalkylammonium cation $R^1R^2R^3R^4N^+$-containing compounds comprises one or more N,N,N-trimethyl-cyclohexylammonium compounds.

2. The process of claim 1, wherein the one or more N,N,N-trimethyl-cyclohexylammonium containing compounds are salts.

3. The process of claim 1, wherein Y is selected from the group consisting of Si, Sn, Ti, Zr, Ge, and mixtures of two or more thereof.

4. The process of claim 1, wherein the one or more sources for $YO_2$ comprises one or more compounds selected from the group consisting of fumed silica, silica hydrosols, reactive amorphous solid silicas, silica gel, silicic acid, water glass, sodium metasilicate hydrate, sesquisilicate, disilicate, colloidal silica, silicic acid esters, and mixtures of two or more thereof.

5. The process of claim 1, wherein X is selected from the group consisting of Al, B, In, Ga, and mixtures of two or more thereof.

6. The process of claim 1, wherein the one or more sources for $X_2O_3$ comprises one or more compounds selected from the group consisting of alumina, aluminates, aluminum salts, and mixtures of two or more thereof.

7. The process of claim 1, wherein the $YO_2$: $X_2O_3$ molar ratio of the mixture according to step (1) ranges from 0.5 to 500.

8. The process of claim 1, wherein the mixture according to step (1) further comprises one or more solvents.

9. The process of claim 1, wherein the $H_2O:YO_2$ molar ratio of the mixture according to step (1) ranges from 3 to 50.

10. The process of claim 1, wherein the molar ratio of the one or more N,N,N-trimethyl-cyclohexylammonium cations: $YO_2$ in the mixture provide according to step (1) ranges from 0.05 to 3.

11. The process of claim 1, wherein the mixture provided in step (1) contains 3 wt.-% or less of one or more metals M based on 100 wt-% of $YO_2$, wherein M stands for sodium or potassium.

12. The process of claim 1, wherein the mixture according to step (1) further comprises one or more sources of one or more elements suitable for isomorphous substitution of at least a portion of the Y atoms and/or of the X atoms in the CHA-type framework structure.

13. The process of claim 1, wherein the molar ratio of $YO_2$ to the one or more elements suitable for isomorphous substitution ranges from 5 to 200.

14. The process of claim 1, wherein the crystallization in step (2) involves heating of the mixture.

15. The process of claim 1, wherein the crystallization in step (2) is conducted under solvothermal conditions.

16. The process of claim 1, wherein the crystallization in step (2) involves heating of the mixture for a period ranging from 0.5 to 50 d.

17. The process of claim 1, wherein the crystallization in step (2) involves agitating the mixture.

18. The process of claim 1, further comprising one or more of the following steps of
   (3) isolating the zeolitic material,
   and/or
   (4) washing the zeolitic material,
   and/or
   (5) drying the zeolitic material,
   and/or
   (6) subjecting the zeolitic material to an ion-exchange procedure,
   wherein the steps (3) and/or (4) and/or (5) and/or (6) can be conducted in any order.

19. The process of claim 18, wherein in the at least one step (6) one or more ionic non-framework elements contained in the zeolite framework is ion-exchanged.

20. The process of claim 1, wherein the amount of seed crystals in the mixture according to step (1) ranges from 0.1 to 20 wt.-% based on 100 wt.-% of $YO_2$ in the at least one source for $YO_2$.

21. The process of claim 1, wherein the mixture provided in step (1) does not contain any substantial amount of a trimethyl benzyl ammonium containing compound.

22. A synthetic zeolitic material having a CHA-type framework structure obtainable and/or obtained according to claim 1, wherein the CHA-type framework structure comprises $YO_2$ and $X_2O_3$, wherein the CHA-type framework does not contain any substantial amount of P and/or As.

23. The zeolitic material of claim 22, wherein the $^{27}Al$ MAS NMR of the untreated zeolitic material as-synthesized comprises:
a first peak (P1) in the range of from 52.3 to 58.6 ppm; and
a second peak (P2) in the range of from −2.3 to −4.1 ppm;
wherein the integration of the first and second peaks in the $^{27}Al$ MAS NMR of the zeolitic material offers a ratio of the integration values P1:P2 comprised in the range of from 1: (0-0.22).

24. The zeolitic material of claim 22, wherein the IR-spectrum of the zeolitic material comprises:
a first absorption band (B1) in the range of from 3,550 to 3,660 $cm^{-1}$; and
a second absorption band (B2) in the range of from 1,800 to 1,930 $cm^{-1}$;
wherein the ratio of the maximum absorbance of the first absorption band to the second absorption band B1: B2 is comprised in the range of from 3.0 to 5.2.

25. The zeolitic material of claim 24, wherein the IR-spectrum of the zeolitic material further comprises:
a third absorption band (B3) in the range of from 3,665 to 3,730 $cm^{-1}$; and
a fourth absorption band (B4) in the range of from 3,450 to 3,545 $cm^{-1}$;
wherein the ratio of the maximum absorbance of the third absorption band to the second absorption band B3: B2 is comprised in the range of from 1.5 to 3.5; and
wherein the ratio of the maximum absorbance of the fourth absorption band to the second absorption band B4: B2 is comprised in the range of from 1.6 to 3.6.

26. The zeolitic material of claim 22, wherein the IR-spectrum of the zeolitic material further comprises:
a first absorption band (B'1) in the range of from 3,550 to 3,660 $cm^{-1}$;
a second absorption band (B'2) in the range of from 3,450 to 3,545 $cm^{-1}$;
a third absorption band (B'3) in the range of from 1,800 to 1,930 $cm^{-1}$;
wherein the ratio of the maximum absorbance of the first absorption band to the third absorption band B'1: B'3 is comprised in the range of from 0.30 to 2.5; and
wherein the ratio of the maximum absorbance of the second absorption band to the third absorption band B'2: B'3 is comprised in the range of from 0.1 to 3.0.

27. The zeolitic material of claim 22, wherein the $YO_2$: $X_2O_3$ molar ratio ranges from 2 to 200.

28. The zeolitic material of claim 22, wherein Y is selected from the group consisting of Si, Sn, Ti, Zr, Ge, and mixtures of two or more thereof.

29. The zeolitic material of claim 22, wherein X is selected from the group consisting of Al, B, In, Ga, and mixtures of two or more thereof.

30. The zeolitic material of claim 22, wherein the zeolitic material comprises one or more zeolites selected from the group consisting of (Ni(deta)$_2$)-UT-6, Chabazite, ILi-Nal [Al—Si—O]-CHA, DAF-5, Dehyd. Na-Chabazite, K-Chabazite, LZ-218, Linde D, Linde R, Phi, SSZ-62, UiO-21, Willhendersonite, ZK-14, ZYT-6, and combinations of two or more thereof.

31. The zeolitic material of claim 22, wherein the BET surface area of the zeolitic material determined according to DIN 66135 ranges from 100 to 850 $m^2/g$.

32. A method for a selective catalytic reduction (SCR) of nitrogen oxides $NO_x$, the method comprising contacting one or more synthetic zeolitic materials having a CHA-type framework structure according to claim 22 as a catalyst with a gas stream at different temperatures.

33. A synthetic zeolitic material having a CHA-type framework structure comprising $YO_2$ and $X_2O_3$,
wherein Y is a tetravalent element and X is a trivalent element,
said material having an X-ray diffraction pattern comprising at least the following reflections:

| Diffraction angle 2θ/° [Cu K(alpha 1)] | Intensity (%) |
|---|---|
| 9.44-9.88 | 29-92 |
| 16.03-16.55 | 32-79 |
| 17.81-18.13 | 12-42 |
| 20.62-21.30 | 100 |
| 25.02-25.42 | 25-70 |
| 30.83-31.43 | 39-73 | wherein 100% relates to the intensity of the maximum peak in the X-ray powder diffraction pattern, and wherein the IR-spectrum of the zeolitic material further comprises:
a first absorption band (B'1) in the range of from 3,550 to 3,660 $cm^{-1}$;
a second absorption band (B'2) in the range of from 3,450 to 3,545 $cm^{-1}$;
a third absorption band (B'3) in the range of from 1,800 to 1,930 $cm^{-1}$;
wherein the ratio of the maximum absorbance of the first absorption band to the third absorption band B'1: B'3 is comprised in the range of from 0.30 to 2.5; and wherein the ratio of the maximum absorbance of the second absorption band to the third absorption band B'2: B'3 is comprised in the range of from 0.1 to 3.0.

34. The zeolitic material of claim 33, wherein the CHA-type framework does not contain any substantial amount of P and/or As.

* * * * *